United States Patent
Hill et al.

(10) Patent No.: US 10,217,094 B2
(45) Date of Patent: Feb. 26, 2019

(54) METHODS AND SYSTEMS FOR NODE-BASED WEBSITE DESIGN

(75) Inventors: Matthew D. Hill, Camas, WA (US); Scott L. McGrew, Vancouver, WA (US); Casey F. Uhrig, Vancouver, WA (US); Greg W. Johnson, Vancouver, WA (US); Kyle J. Nelson, Battleground, WA (US); Thomas F. Gillespie, Phoenix, MD (US)

(73) Assignees: BEGUIDED INC., Hunt Valley, MD (US); THE INTERPROSE CORPORATION, Vancouver, WA (US)

( * ) Notice: Subject to any disclaimer, the term of this patent is extended or adjusted under 35 U.S.C. 154(b) by 0 days.

(21) Appl. No.: 13/464,919

(22) Filed: May 4, 2012

(65) Prior Publication Data
US 2012/0221939 A1    Aug. 30, 2012

Related U.S. Application Data

(62) Division of application No. 12/170,376, filed on Jul. 9, 2008, now Pat. No. 8,200,578.

(51) Int. Cl.
| | |
|---|---|
| *G06Q 40/00* | (2012.01) |
| *G06Q 20/12* | (2012.01) |
| *G06Q 20/10* | (2012.01) |
| *G06Q 30/02* | (2012.01) |
| *G06Q 30/06* | (2012.01) |
| *G06F 3/01* | (2006.01) |
| *G06K 9/00* | (2006.01) |

(Continued)

(52) U.S. Cl.
CPC ............ *G06Q 20/12* (2013.01); *G06F 3/017* (2013.01); *G06K 9/00315* (2013.01); *G06Q 20/10* (2013.01); *G06Q 20/102* (2013.01); *G06Q 20/30* (2013.01); *G06Q 30/0213* (2013.01); *G06Q 30/06* (2013.01); *G06Q 30/0603* (2013.01); *G06Q 40/00* (2013.01); *G06T 13/40* (2013.01); *G06F 3/04817* (2013.01)

(58) Field of Classification Search
USPC .......................................................... 705/40
See application file for complete search history.

(56) References Cited

U.S. PATENT DOCUMENTS

| | | | |
|---|---|---|---|
| 5,727,950 A | 3/1998 | Cook et al. | |
| 5,845,299 A * | 12/1998 | Arora ................... | G06F 17/218 715/209 |

(Continued)

OTHER PUBLICATIONS

Thiemann, P. (2004). Server-side web programming in WASH Retrieved from https://dialog.proquest.com/professional/docview/831925399?accountid=142257 (Year: 2004).*

(Continued)

*Primary Examiner* — Kito R Robinson
(74) *Attorney, Agent, or Firm* — Wilson Sonsini Goodrich & Rosati

(57) ABSTRACT

Aspects of the present invention relate to systems and methods for design and use of web-based applications for account management. Some aspects relate to design tools that enable the use of a virtual agent or avatar as part of an account collection or management web application. Some aspects relate to applications, utilities and tools for node-based web resource design.

21 Claims, 33 Drawing Sheets

(51) Int. Cl.
*G06Q 20/30* (2012.01)
*G06T 13/40* (2011.01)
*G06F 3/0481* (2013.01)

(56) References Cited

U.S. PATENT DOCUMENTS

| | | | |
|---|---|---|---|
| 5,870,559 A * | 2/1999 | Leshem et al. | 709/224 |
| 5,880,731 A * | 3/1999 | Liles | G06F 3/0481 |
| | | | 345/473 |
| 5,956,720 A * | 9/1999 | Fernandez et al. | |
| 6,125,385 A * | 9/2000 | Wies | G06F 3/016 |
| | | | 345/163 |
| 6,300,947 B1 * | 10/2001 | Kanevsky | G06F 17/30905 |
| | | | 707/E17.121 |
| 6,330,551 B1 | 12/2001 | Burchetta et al. | |
| 6,408,430 B2 * | 6/2002 | Gunter et al. | 717/109 |
| 6,519,571 B1 * | 2/2003 | Guheen | G06Q 30/02 |
| | | | 705/14.66 |
| 6,850,918 B1 | 2/2005 | Burchetta et al. | |
| 6,954,741 B1 | 10/2005 | Burchetta et al. | |
| 7,076,728 B2 * | 7/2006 | Davis | G06F 17/243 |
| | | | 709/220 |
| 7,110,979 B2 * | 9/2006 | Tree | G06Q 20/02 |
| | | | 705/35 |
| 7,316,003 B1 * | 1/2008 | Dulepet | G06F 17/218 |
| | | | 717/110 |
| 7,844,907 B2 * | 11/2010 | Watler | G06F 17/3089 |
| | | | 715/735 |
| 7,886,276 B2 * | 2/2011 | Tai | G06F 11/3604 |
| | | | 717/125 |
| 8,200,578 B2 | 6/2012 | Hill et al. | |
| 8,375,294 B2 * | 2/2013 | Toebes | G06F 17/24 |
| | | | 715/229 |
| 8,458,041 B1 * | 6/2013 | Jakobsson | G06Q 30/06 |
| | | | 705/26.1 |
| 8,495,503 B2 * | 7/2013 | Brown | H04L 67/36 |
| | | | 704/9 |
| 8,606,610 B2 * | 12/2013 | Black | G06Q 30/0201 |
| | | | 705/7.12 |
| 8,751,393 B1 * | 6/2014 | Murray | G06Q 40/02 |
| | | | 705/42 |
| 8,833,639 B1 * | 9/2014 | Hopkins, III | G06Q 20/1085 |
| | | | 235/375 |
| 9,299,178 B2 * | 3/2016 | Bokor | G06T 13/40 |
| 9,773,264 B2 * | 9/2017 | Brown | G06F 3/04817 |
| 2001/0052112 A1 * | 12/2001 | Mohan | G06F 8/30 |
| | | | 717/100 |
| 2002/0078103 A1 * | 6/2002 | Gorman | G06F 8/34 |
| | | | 715/234 |
| 2002/0165821 A1 * | 11/2002 | Tree | G06Q 20/02 |
| | | | 705/39 |
| 2003/0028477 A1 | 2/2003 | Stevenson et al. | |
| 2003/0074290 A1 | 4/2003 | Clore | |
| 2004/0001090 A1 * | 1/2004 | Brown | G06Q 10/107 |
| | | | 715/752 |
| 2004/0006483 A1 | 1/2004 | Sasaki et al. | |
| 2004/0075686 A1 * | 4/2004 | Watler | G06F 17/3089 |
| | | | 715/749 |
| 2004/0177113 A1 * | 9/2004 | Nguyen | G06F 17/30067 |
| | | | 709/203 |
| 2004/0230897 A1 * | 11/2004 | Latzel | G06F 17/3089 |
| | | | 715/234 |
| 2005/0086600 A1 * | 4/2005 | Black | G06Q 20/1085 |
| | | | 715/706 |
| 2005/0216300 A1 * | 9/2005 | Appelman | G06Q 10/10 |
| | | | 705/319 |
| 2005/0246283 A1 * | 11/2005 | Gwiazda | G06F 17/3089 |
| | | | 705/52 |
| 2006/0028475 A1 * | 2/2006 | Tobias | A63F 13/12 |
| | | | 345/473 |
| 2006/0098639 A1 * | 5/2006 | Sakai | H04W 4/12 |
| | | | 370/360 |
| 2006/0184355 A1 * | 8/2006 | Ballin | G06F 3/011 |
| | | | 704/8 |
| 2006/0212461 A1 * | 9/2006 | Meysman | G06F 17/30961 |
| 2007/0035546 A1 * | 2/2007 | Kim | G06T 13/00 |
| | | | 345/473 |
| 2007/0045395 A1 * | 3/2007 | Corona | G06Q 20/10 |
| | | | 235/379 |
| 2007/0156554 A1 | 7/2007 | Nikoley et al. | |
| 2007/0238085 A1 * | 10/2007 | Colvin | G09B 5/00 |
| | | | 434/365 |
| 2008/0096533 A1 * | 4/2008 | Manfredi | G06N 3/006 |
| | | | 455/412.1 |
| 2008/0133402 A1 | 6/2008 | Kurian et al. | |
| 2008/0255980 A1 | 10/2008 | Kasower | |
| 2008/0293019 A1 | 11/2008 | Dooley et al. | |
| 2008/0307328 A1 * | 12/2008 | Hatcher | H04L 51/066 |
| | | | 715/760 |
| 2008/0309675 A1 * | 12/2008 | Fleury | G06T 17/00 |
| | | | 345/581 |
| 2009/0031225 A1 * | 1/2009 | Toebes | G06F 17/24 |
| | | | 715/760 |
| 2009/0063517 A1 * | 3/2009 | Wright | G06F 17/30274 |
| 2009/0119588 A1 | 5/2009 | Moore | |
| 2009/0251471 A1 * | 10/2009 | Bokor | G06T 13/40 |
| | | | 345/474 |
| 2009/0259648 A1 | 10/2009 | Bokor et al. | |
| 2010/0121780 A1 * | 5/2010 | Sheridan | G06Q 40/02 |
| | | | 705/36 R |
| 2010/0131876 A1 * | 5/2010 | McGuire | A63F 13/12 |
| | | | 715/765 |
| 2010/0211638 A1 * | 8/2010 | Rougier | G06F 8/30 |
| | | | 709/205 |
| 2011/0191702 A1 * | 8/2011 | Lunsford | G06F 3/048 |
| | | | 715/763 |
| 2013/0232402 A1 * | 9/2013 | Lu | G06F 17/30861 |
| | | | 715/234 |

OTHER PUBLICATIONS

Hakkaido bank uses eGain assistant to launch Japan's first virtual agent for customer service. (Mar. 11, 2002). Business Wire [Retrieved from https://dialog.proquest.com/professional/docview/678347856?accountid=142257] (Year: 2002) pp. 1-2.
http://apolloenterprise.com/solutions/solutions.htm (Nov. 21, 2007).
http://oddcast.com/about/ (Aug. 30, 2007).
http://www.debtresolve.com/products_how.php (Nov. 27, 2007).
http://www.debtresolve.com/products_tech.php (Nov. 27, 2007).
http://www.sitepal.com/howitworks (Jul. 10, 2008).
Jim DeBrosse—Staff Writer. Negotiators in different cities now can sit at common table:A UD law professor uses Second Life Web site to teach her students future methods of mediation. Dayton Daily News, A.4. ((2008) (Retrieved Mar. 26, 2012).
U.S. Appl. No. 12/170,376 Notice of Allowance dated Apr. 2, 2012.
U.S. Appl. No. 12/170,376 Office Action dated Apr. 14, 2010.
U.S. Appl. No. 12/170,376 Office Action dated Oct. 21, 2009.
U.S. Appl. No. 12/170,376 Office Action dated Sep. 15, 2011.
U.S. Appl. No. 15/354,930 Final Office Action dated Nov. 15, 2017.
U.S. Appl. No. 15/354,930 Non-final Office Action dated Feb. 3, 2017.
U.S. Appl. No. 15/354,930 Non-Final Office Action dated Jun. 19, 2017.
U.S. Appl. No. 15/354,930 Notice of Allowance dated Mar. 29, 2018.

* cited by examiner

Sɲ Health Care Services

Issue Resolution

- Home
- Contact Us
- Payment Schedule
- Logout

[Please select one of the options listed so that we can assist you in resolving any issues with your account.] ← 40

Issue Resolution

| | |
|---|---|
| ○ | I Can't Pay the Full Balance Today |
| ○ | I Dispute Some or All of the Charges |
| ○ | I am the Victim of Identity Theft |
| ○ | I Paid this Bill Before I Received your Statement |
| ● | I Have Filed for Bankruptcy |
| ○ | Other Reason |

← 41
← 42
← 43
← 44
← 45
← 46

INTERPROSE

Welcome Home Node

Type

Node Label:

Text

SUMMARY

Welcome Home Node

Hello, welcome to the Victoria Health System, my name is Grace and I will be assisting you today.

If you need to start over at any time, simply click on the Home link above.

Please click Next to continue.

Payment System Test
Save | Delete | Clear

Next

FIG. 16

| | | | |
|---|---|---|---|
| Please Select One | | | |
| Type | OPTIONS | | |
| Node Label * | Please Select One | | |
| Page Label | Issue Resolution | | |
| Text | Please select one of the options listed so that we can assist you in resolving any issues with your account. | | |

| Options | | | |
|---|---|---|---|
| | Label | Variable | Prompt |
| | I Can't Pay the Full Balance Today — 130 | PartialPayment | 13 |
| | I Dispute Some or All of the Charges | DisputeCharges | 24 |
| | I am the Victim of Identity Theft | DisputeIDTheft | 27 |
| | I Paid this Bill Before I Received your Statement | DisputePrePaidDate | 29 |
| | I Have Filed for Bankruptcy — 131 | DisputeBankruptcy | 40 |
| | I Would Like to Apply for Financial Assistance | Apply_for_CC | 191 |
| | Other Reason | DisputeOther | 26 |

Update Option — 132

| | |
|---|---|
| Label | I Can't Pay the Full Bala |
| Variable | PartialPayment |
| Prompt | Payment Plan Options |

[Save] [Delete] [Clear]

[Save] [Delete] [Clear]

| SettlePayPlan | |
|---|---|
| Type | PAYMENT_PLAN |
| Node Label | SettlePayPlan |
| Start Date (max number of days from today) | 14 |
| Number Of Payments | 1 |
| Payment Frequency | Monthly |
| Payment Amount | $ 0.00 |
| Payment Total | $ 0.00  currentBalance |
| Down Payment Percent | 0.0 % |
| Period | 1 |
| Next Node | End |

Save | Delete | Close

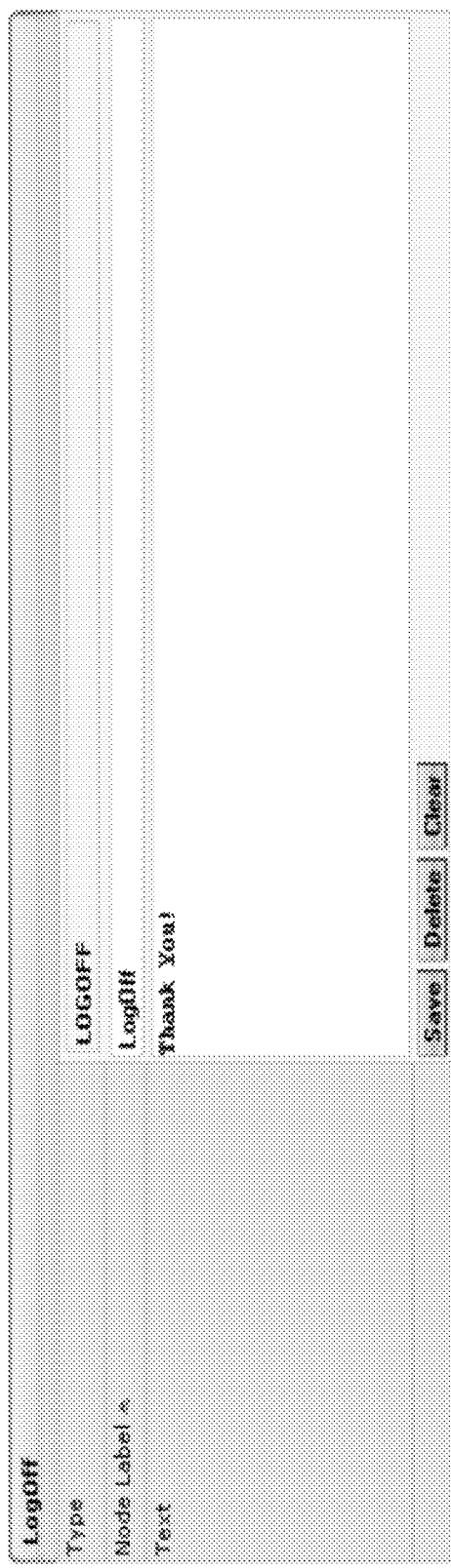

METHODS AND SYSTEMS FOR NODE-BASED WEBSITE DESIGN

RELATED REFERENCES

This application is a divisional of U.S. patent application Ser. No. 12/170,376, entitled "Methods and Systems for Account Management and Virtual Agent Design and Implementation," filed on Jul. 9, 2008 now U.S. Pat. No. 8,200,578.

FIELD OF THE INVENTION

Embodiments of the present invention comprise methods and systems for the node-based design, management, implementation and use of web-based applications for account management.

BACKGROUND

A great deal of modern commerce involves the use of credit accounts that allow consumers to obtain goods, services, cash and other commodities in exchange for an agreement to pay the requisite fees under pre-defined terms. Many of these consumers or account-holders/borrowers honor their agreements and pay the requisite fees according to the agreed-upon terms. However, a certain number of account-holders are not willing or are not able to uphold their end of the agreement and do not pay the requisite fees. When payment terms are violated, creditors may be forced to take action to collect the debt.

A creditor may have several options for collecting the debt. A creditor can contact the borrower and renegotiate the agreement or take legal action to enforce the agreement. Both of these options involve additional work and expense. Contacting a borrower may involve research to locate the borrower and additional time to travel to the borrower and make contact. Once contacted, the borrower may be uncooperative. In many cases, this additional expense cannot be recovered by the creditor. The expense of legal action is also well known and, in many cases, may be more than the debt to be collected. Furthermore, a borrower may be judgment-proof, wherein he or she does not have enough assets to cover the debt even when a legal action forces such payment.

If a creditor cannot find a method for efficient collection of over-due debts, the creditor may have to incur unexpected losses.

Many account-holders who do not have delinquent accounts also seek a convenient method for paying and managing their debts.

SUMMARY

Some embodiments of the present invention comprise methods and systems for design and use of web-based applications for account management. Some embodiments may comprise a virtual agent or avatar as part of an account collection or management web application. Some embodiments may comprise applications, utilities and tools for account-related web resource design, management and implementation.

Some embodiments comprise a method for designing a web-based account management web site, the method comprising receiving first node data for a first node, wherein said first node data comprises first node variable values associated with first node variables that define a first account management web page and a corresponding first node icon; and displaying said first node icon in a graphical editor window such that said first node icon represents a first flow chart element in a flow chart that represents said account management web site.

Some embodiments comprise a method for designing a web-based account management web site, the method comprising: displaying a graphical user interface comprising a graphical representation of a web site, said graphical representation comprising node icons representing pre-defined web pages (nodes) and node links representing logical links between said nodes; wherein said graphical representation has a flow-chart-like appearance comprising said node icons connected by visible links representing said logical links; wherein node variables, related to said nodes, define node characteristics comprising input and output mechanisms for said nodes; and wherein said graphical representation further comprises a node data window for at least one of said nodes, wherein said node data window provides for user manipulation of said node variables for said at least one of said nodes.

Some embodiments comprise a non-transitory, computer-readable medium comprising computer-executable instructions for implementing a method for designing a web-based account management web site, said computer-readable medium comprising instructions for: displaying a graphical user interface comprising a graphical representation of a web site, said graphical representation comprising node icons representing pre-defined web pages (nodes) and node links representing logical links between said nodes; wherein said graphical representation has a flow-chart-like appearance comprising said node icons connected by visible links representing said logical links; wherein node variables, related to said nodes, define node characteristics comprising input and output mechanisms for said nodes; and wherein said graphical representation further comprises a node data window for at least one of said nodes, wherein said node data window provides for user manipulation of said node variables for said at least one of said nodes.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 5 is a screenshot of an exemplary issue resolution web page;

FIG. 7 is a screenshot of an exemplary dispute detail web page;

FIG. 16 is a screenshot of an exemplary Summary Node Interface;

FIG. 19 is a screenshot of an exemplary Options Node Interface;

FIG. 20 is a screenshot of an exemplary Property Set Interface;

FIG. 22 is a screenshot of an exemplary Payment Plan Node Interface;

FIG. 23 is a screenshot of an exemplary Bankruptcy Node Interface;

FIG. 24 is a screenshot of an exemplary Dispute Node Interface;

FIG. 25 is a screenshot of an exemplary E-mail Node Interface;

FIG. 26 is a screenshot of an exemplary Exec Node Interface;

FIG. 29 is a screenshot of an exemplary Eval Node Interface;

FIG. 30 is a screenshot of an exemplary Form Node Interface;

FIG. 31 is a screenshot of an exemplary Update Form Interface;

FIG. 32 is a screenshot of an exemplary Fields Interface, an exemplary Update Field Interface and an exemplary Preview Form display; and FIG. 33 is a screenshot of an exemplary Logoff Node Interface.

DETAILED DESCRIPTION OF EXEMPLARY EMBODIMENTS

Figure 1:
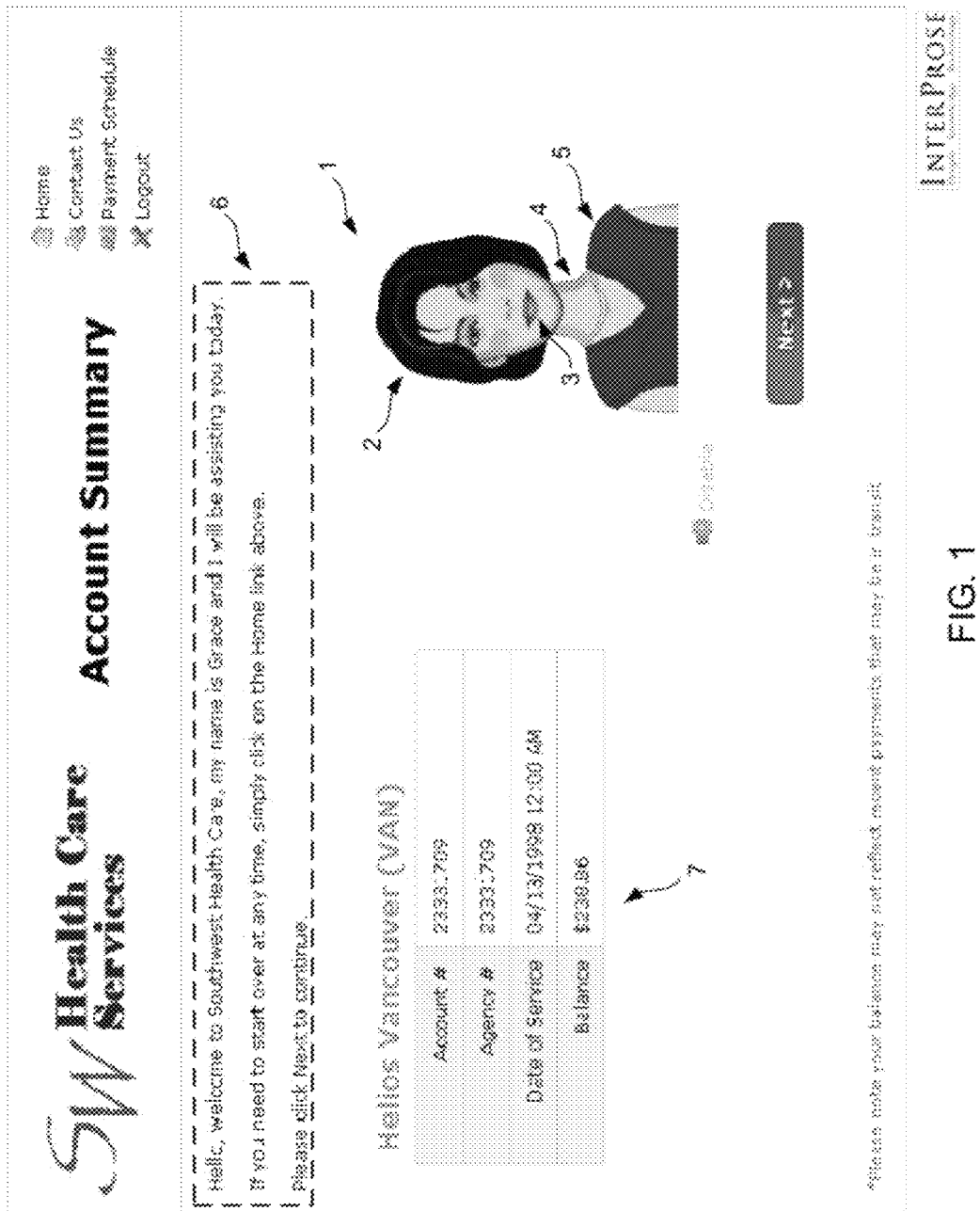
FIG. 1 is a screenshot of an exemplary account summary web page.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

When an account becomes overdue, a borrower often needs help to negotiate and manage the account to a favorable outcome. Some studies show that the majority of creditors typically have Internet access. Other studies show that many creditors who have an overdue balance would rather respond to an on-line agent than a live agent. However, a simple web site typically lacks a personal touch and fails to make any contact on an emotional level. Often, a personal or emotional connection is all that is needed to turn a soon-to-be-adversarial encounter into a mutually-beneficial negotiation. This type of connection can be made more probable with a web site through the use of a virtual agent.

Some embodiments of the present invention relate to account management and collections through the use of a web-based virtual agent. Some embodiments comprise a virtual agent or avatar, which communicates with an end user to effectuate account negotiations or payment. In some embodiments, the virtual agent may emulate a human agent in appearance and sound and may deliver a scripted message to the user. In some embodiments, the virtual agent may be adaptive to user characteristics in order to present a more appealing appearance or to establish a favorable demeanor with a user.

An important aspect of a virtual agent in account management and collections is their human-like characteristics. A virtual agent may comprise human features that are typically used to establish an emotional connection. In human relations, eye contact is important in showing interest, concern and emotion and in establishing a connection with a person. Facial expression is another characteristic that is sensed visually and interpreted as communication that adds a personal layer to speech. A concerned facial expression, even one that originates from a virtual person, can soften an otherwise adversarial relationship and render an account holder more likely to pay a balance or prioritize account payment above other priorities.

A virtual agent may also comprise adaptive voice tonal qualities. An apologetic or concerned tone at the onset of a collections interaction can convey a willingness to help and put an account holder more at-ease rather than up-tight and adversarial. Likewise, an upbeat, happy tone of voice during payment processing or negotiating can reinforce an account holder's inclination to make a payment. In some embodiments, a virtual agent may also act on tonal variables to form tonal gestures, such as a sigh, and to express a tone of exclamation, surprise or relief.

In some embodiments of the present invention, a virtual agent that comprises a representation of at least a part of the human body can perform gestures to add to its repertoire of communicative actions. A virtual agent comprising a head, neck and shoulders may perform head movement gestures, such as nodding its head, tossing hair back or lowering its head in disapproval. In another exemplary embodiment, a virtual agent comprising a head, arm and hand may make hand gestures to show surprise, concern, shock, empathy, sympathy and other emotions that are typically signaled by hand gestures.

A virtual agent comprising variable voice characteristics and an animated representation of at least a part of the human body can be a powerful tool in the collection and negotiation processes. Although the virtual agent may not interact at the level of a live human agent, many users with overdue balances are embarrassed and shy away from real human interaction on the subject of their delinquent balance. While they shrink from real human interaction because of embarrassment, typical users still desire and respond positively to the personal touch of a virtual agent who shows concern and courtesy without the embarrassment of actual personal interaction.

User-Adaptive Virtual Agent

Some embodiments of the present invention may comprise a user-adaptive virtual agent that adapts to user data. User data may comprise a user's height, weight, race, gender, income, area of residence, zip code, area code, telephone number, occupation, marital status, product preferences, purchase history, credit information, account balances and other personal, professional, demographic and other information. Some embodiments may comprise a virtual agent that is adaptive to user data. A user-adaptive virtual agent application may modify virtual agent characteristics based on user data. For example, in an exemplary embodiment, a virtual agent's characteristics may vary based on a user's location. A user's location may be determined by address, zip code, area code, telephone number or by other information. When the location is determined, the virtual agent's characteristics may be modified or set to correspond to the user's location. In an exemplary embodiment, when the user's location is determined to be in the southeastern part of the United States, the virtual agent's voice, hairstyle, hair color, clothing, accessories, skin color and racial characteristics, apparent age, and other characteristics may be set to parameters that have been determined to be preferred for that location. Preferred characteristics for a location may be determined based on demographic data derived from surveys, studies and other sources.

Embodiments of the present invention may match a set of virtual agent characteristics to a set of user data. For example, a middle-aged, affluent man living in the Northwest may prefer to speak to a younger, attractive, well-dressed, brunette woman with a complex vocabulary. In this scenario, the virtual agent may take on these preferred characteristics when a user is determined to be a middle-aged, affluent man living in the Northwest. When the next user, a female between 20 and 30 years of age with little credit history, logs onto the system; the virtual agent may change characteristics to a dark-haired male in the mid-twenties with a deep voice and muscular arms. In some embodiments, each variation of user data may be assigned to a set of virtual agent characteristics. In some embodiments, a database may be employed to match user data to virtual agent characteristics. In some embodiments a look-up table may be used for this purpose. In some embodiments, a multi-dimensional matrix may be used to match virtual agent characteristic sets to sets of user data.

Some embodiments of the present invention may comprise a virtual agent designer or design tool for implementing the virtual agent and other features in a web-based account management scenario. In some embodiments, the virtual agent designer may comprise a graphical user interface that enables assembly of a complete virtual-agent-enabled account management web site, which provides for account data management, payment processing and balance negotiation.

Exemplary Virtual Agent Applications

Some embodiments of the present invention comprise a web-based account management resource with a virtual agent. In an exemplary embodiment, illustrated in FIG. 1, the virtual agent 1 is represented as a partial human figure with a head and partial body shown. The virtual agent may comprise hair 2, facial features 3, skin tone 4 and clothing and accessories 5. In an exemplary embodiment, the virtual agent may be animated to show movement, facial expressions, lip movement to simulate speech or other expressions. Some embodiments may comprise head, hand, eye and other gestures alone or coupled with speech. In some embodiments, the virtual agent may form part of a multimedia presentation by presenting a message that is also presented textually on the web page. For example, a virtual agent 1 may "read" a text message 6 that is presented in text on the page. In presenting the message, the virtual agent may use head, hand, eye and facial movements, expressions or gestures to help articulate the message. In some embodiments, a virtual agent may also vary voice intonation for dramatic effect. In some embodiments, a virtual agent may be presented with account information 7 and may present the account information verbally or point out the information with a gesture. In some embodiments, a virtual agent may be presented with a login prompt to prompt access to the system.

Figure 2:
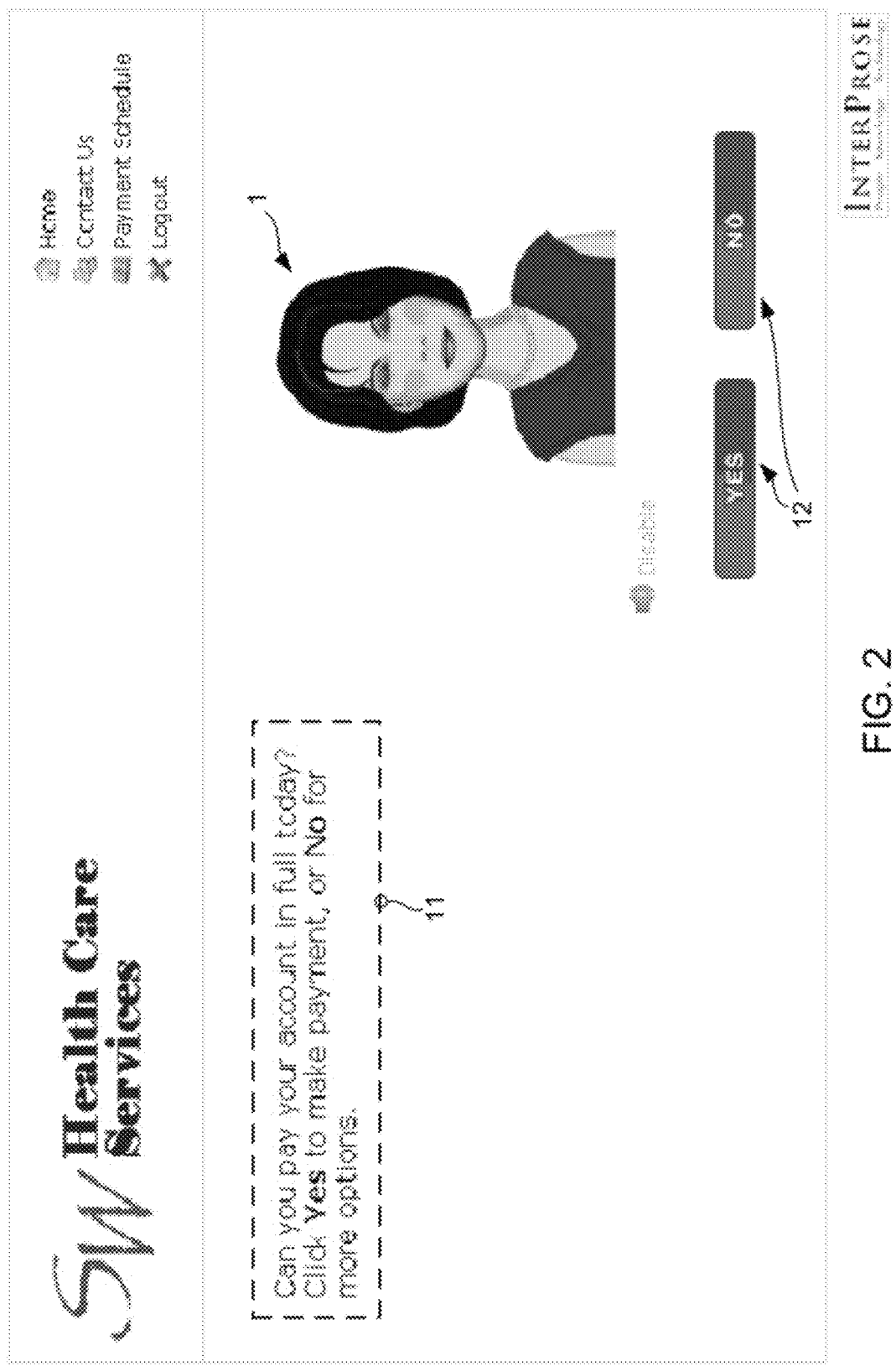
FIG. 2 is a screenshot of an exemplary pay-in-full web page.

Some exemplary embodiments of the present invention, illustrated in FIG. 2, may comprise a virtual agent 1 on a binary question/response page. In these embodiments, the virtual agent may present a question that may be answered with a yes or no response. In some embodiments, the question may also be presented in textual form 11 on the page. Input buttons 12 or similar input mechanisms may be used to collect an end-user response to the question. In some embodiments, the logic of the virtual agent 1 may operate on the actual text stored for text display 11, thereby "reading" the stored text using a text-to-voice process. In other embodiments, a voice recording or sound file may be recorded and played in conjunction with virtual agent animation to present a message corresponding to the displayed text 11. In an exemplary embodiment of an account management application, a virtual agent 1 may ask whether the end user can pay the delinquent account in full at that time. If the end user answers in the affirmative, the user may be directed to a scheduling page.

Figure 3:
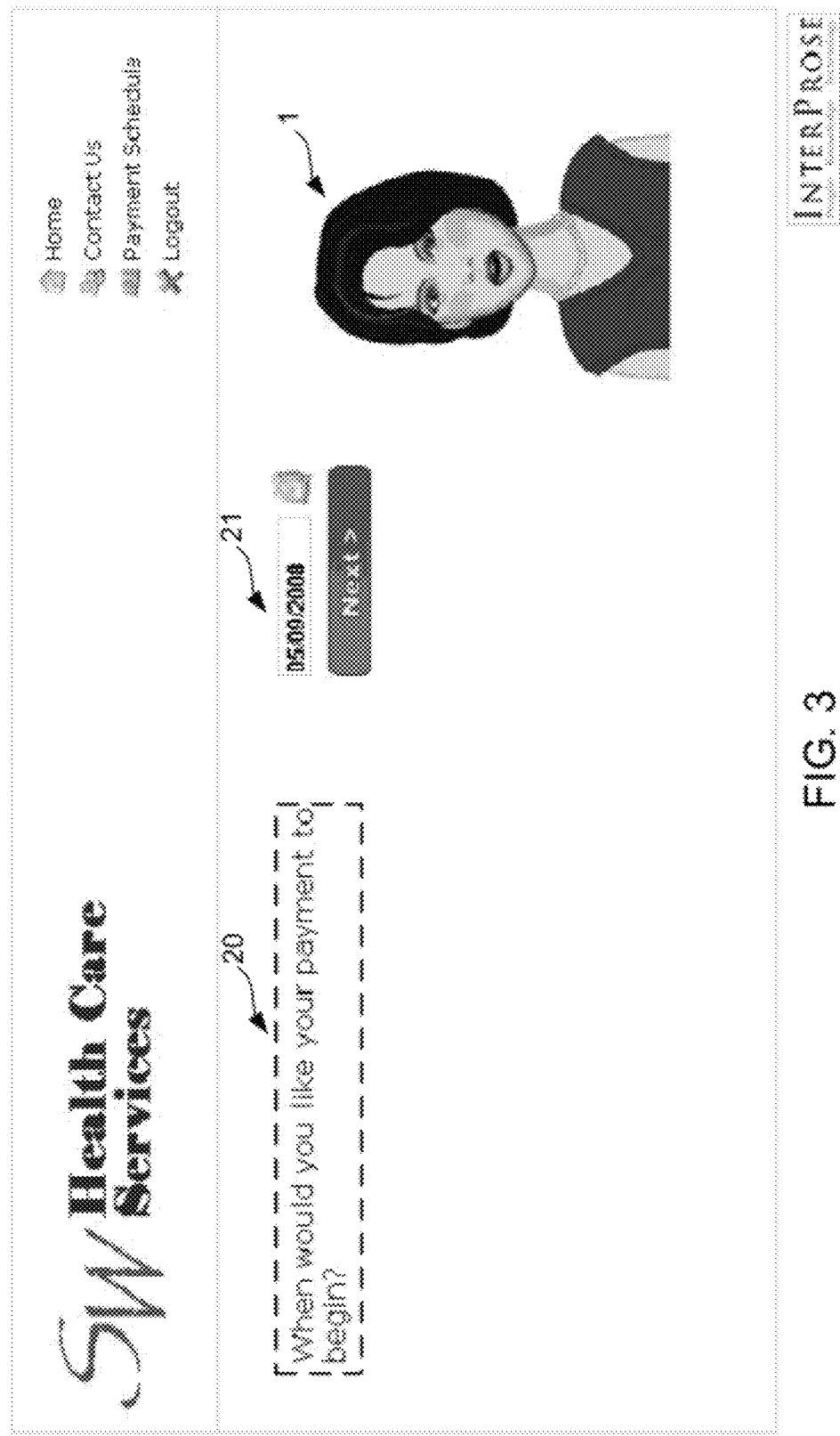
FIG. 3 is a screenshot of an exemplary payment start date web page.

Some embodiments of the present invention may comprise a virtual-agent-enhanced scheduling page, as illustrated in FIG. 3. In these embodiments, a virtual agent 1 may present a scheduling message 20. An exemplary scheduling message may ask the end user when a payment can be made. In some embodiments, a calendar, such as a pop-up calendar 21 may be presented along with the virtual agent 1. The calendar may allow an end user to schedule a payment with simple point and click actions. In some embodiments, limitations may be placed on scheduled payments. For example, the limitation that a payment must be made within 14 days may be enforced through the calendaring system or through messaging during the calendaring process. In some embodiments, the virtual agent 1 may present a message identifying payment and scheduling limitations. Successful scheduling of a payment may link the user to a payment type page.

Figure 4:
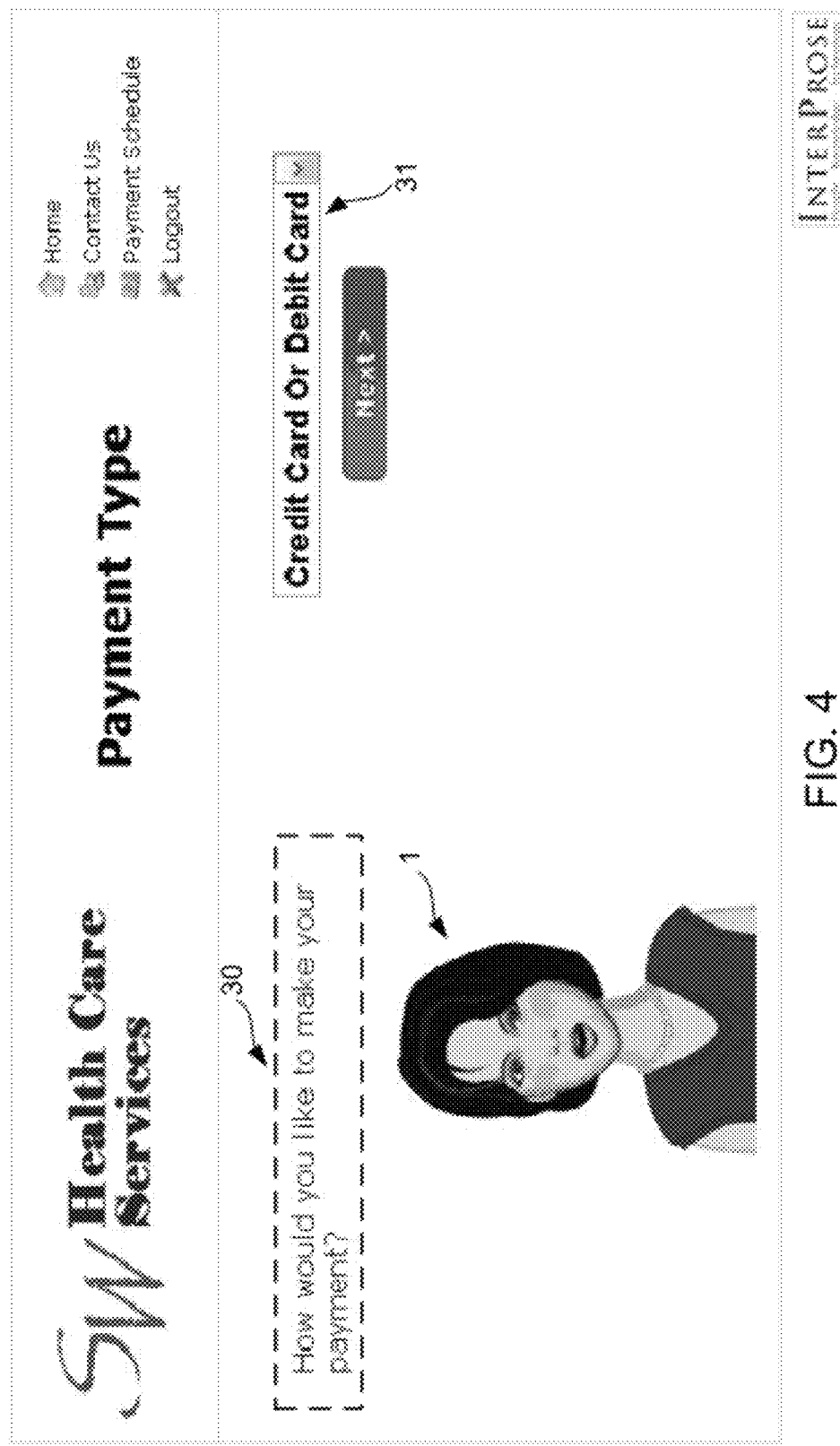
FIG. 4 is a screenshot of an exemplary payment type web page.

Some embodiments of the present invention may comprise a payment type page, as illustrated in FIG. 4. In these embodiments, a virtual agent 1 may present a payment type selection message 30, which may also be displayed in textual form on the payment type page. This presentation may be performed in conjunction with a payment type selection mechanism 31, such as a drop-down menu or similar selection mechanism. In some embodiments, the payment type selection mechanism may allow a user to choose to make a payment by debit card, credit card, electronic check or by other methods. Selection of a payment option may link to a payment info page that may collect payment details and perform an electronic payment transaction.

In an exemplary embodiment of an account management application, a virtual agent 1 may ask whether the end user can pay the delinquent account in full at that time, as illustrate in FIG. 2. If the end user answers in the negative, the user may be directed to a issue resolution page. An exemplary issue resolution page is illustrated in FIG. 5. In this exemplary embodiment, a virtual agent may present a selection message. The selection message may also be presented in text 40 as well as an audiovisual presentation by the virtual agent. An issue resolution page may also comprise a menu of issue resolution options. Exemplary issue resolution options may comprise a declaration that the balance cannot be made in full at the present time 41, a declaration that the user disputes all or a portion of the balance 42, a declaration that the user is the victim of identity fraud 43, a declaration that the user has paid the balance before receiving a statement 44, a declaration that the user has filed for bankruptcy 45 and a declaration that the balance has not been paid for a reason other than those listed as options 46.

Figure 6:
FIG. 6 is a screenshot of an exemplary payment plan web page.

In an exemplary embodiment, when a user makes a selection on an issue resolution page indicating that the entire balance of the account cannot be paid 41, the user may be linked to a payment options page. An exemplary payment options page is illustrated in FIG. 6. In this exemplary embodiment, a virtual agent 1 may present a payment options message 50, which may also be present in text form. The payment options page may also comprise payment option selections 51-53. Exemplary payment options may comprise: 10% down and 6 payments 51; 25% down and 4 payments 52; 50% down and 3 payments 53 or other payment options. Selection of one of the payment options may link a user to subsequent payment scheduling, payment type and payment information collection pages.

Figure 7:
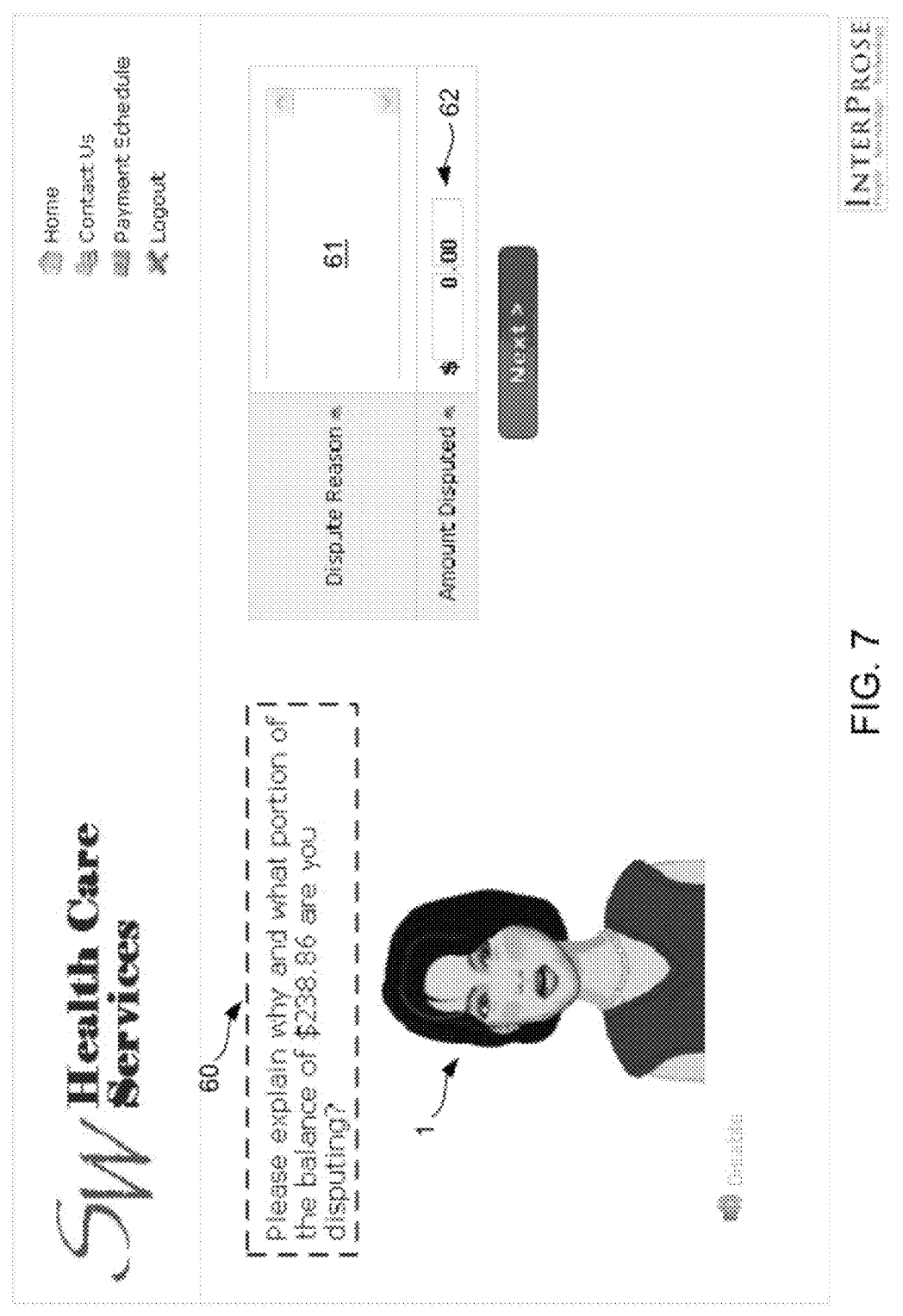

In an exemplary embodiment, when a user makes a selection indicating that part or all of the balance is disputed 42, the user may be linked to a dispute information page, as illustrated in FIG. 7. In this exemplary embodiment, a virtual agent 1 may present a dispute information message 60, which may also be present in text form. A dispute information page may also comprise a dispute reason box 61 for providing a reason for the dispute. The page may also comprise a dispute amount indication mechanism, such as a numeric entry box 62, where the amount in dispute may be indicated by the user.

Figure 8:
FIG. 8 is a screenshot of an exemplary identity theft data web page.

In an exemplary embodiment, when a user makes a selection on an issue resolution page indicating that identity theft has occurred, the user may be linked to an ID theft information page, as illustrated in FIG. 8. The ID theft information page, may comprise a virtual agent 1, which may make an audiovisual presentation of an ID theft information message 70, which may also be presented in text form. The ID theft information page may also comprise an ID theft information entry mechanism 71, such as a text entry box for accepting ID theft information.

Figure 9:
FIG. 9 is a screenshot of an exemplary payment made web page.

In an exemplary embodiment, when a user makes a selection on an issue resolution page indicating that a payment has been made 44, the user may be linked to a payment information page, as illustrated in FIG. 9. The payment information page may comprise a virtual agent 1, which presents a payment information message 80. The payment information may also be presented in text form. A payment information page may also comprise a payment information entry mechanism 81, such as a text or numeric entry box.

Figure 10:
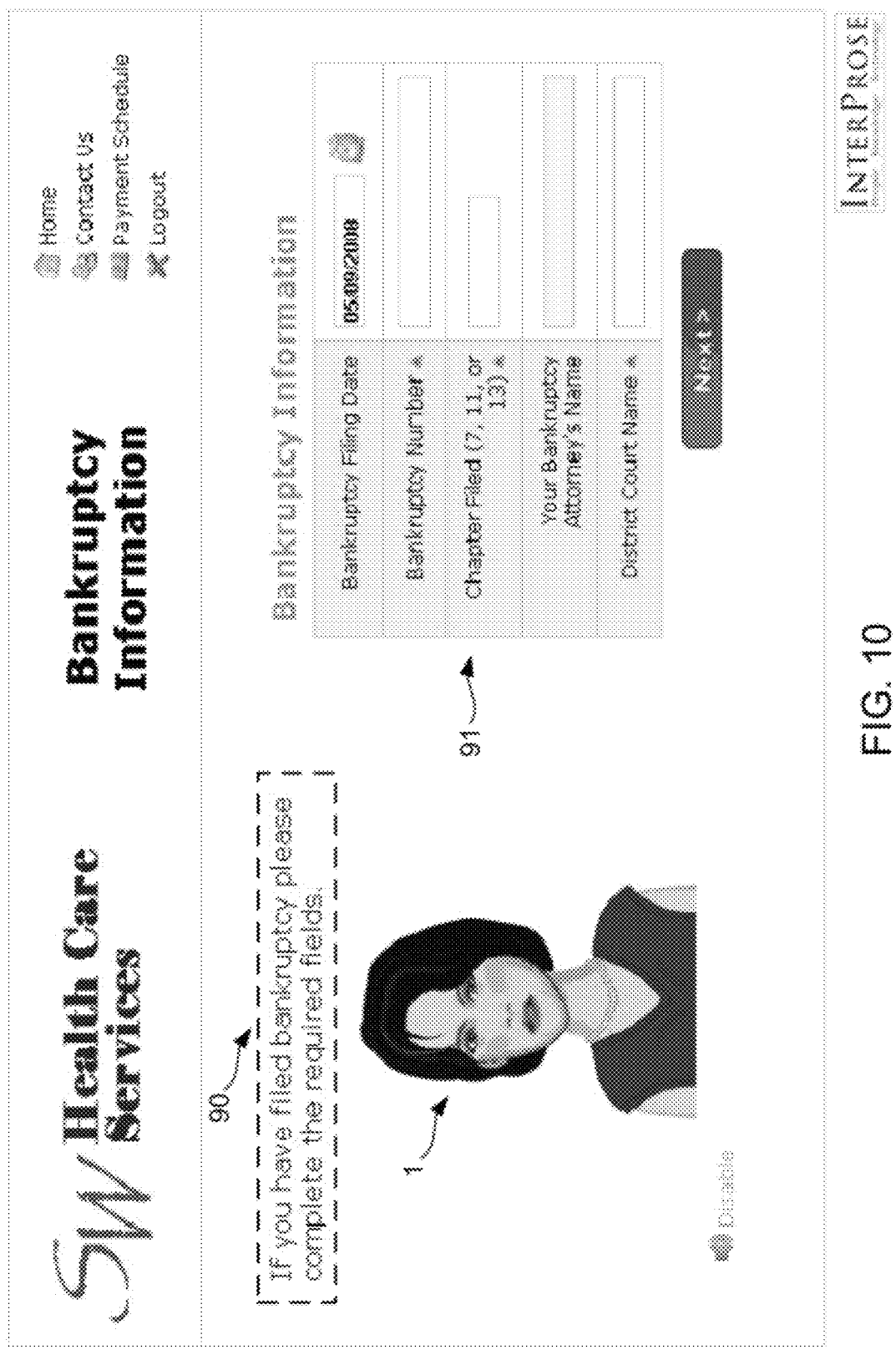
FIG. 10 is a screenshot of an exemplary bankruptcy data web page.

In an exemplary embodiment, when a user makes a selection on an issue resolution page indicating that the user has filed for bankruptcy 45, the user may be linked to a bankruptcy information page, such as the page illustrated in FIG. 10. A bankruptcy information page may comprise a virtual agent 1, which may present a bankruptcy information message 90. A bankruptcy information message may also be presented in text form. A bankruptcy information page may also comprise a bankruptcy information input mechanism 91, such as one or more text or numeric input boxes for collection of bankruptcy information.

Virtual Agent Designer

Figure 11:
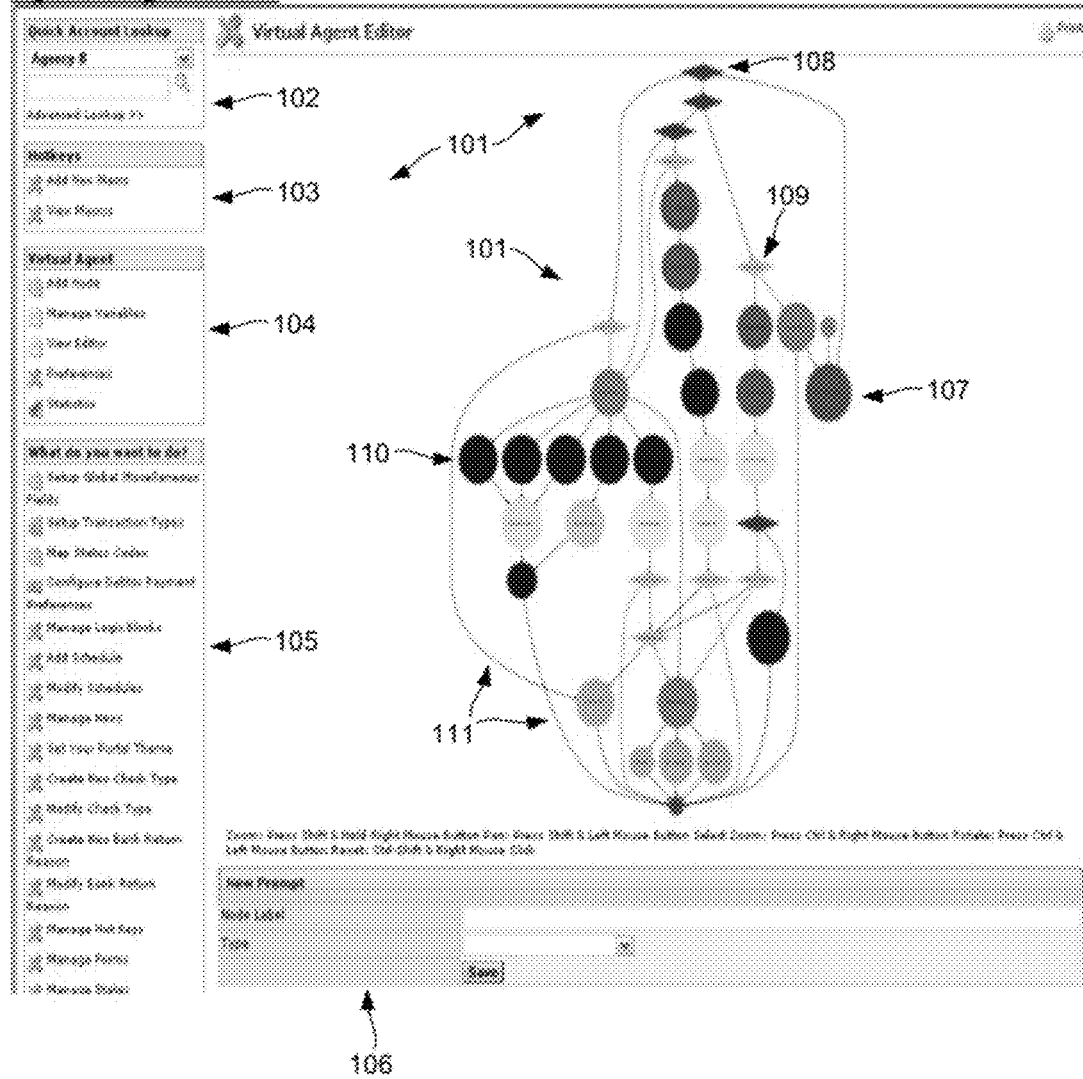
FIG. 11 is a screenshot of an exemplary virtual agent editor window.

Some embodiments of the present invention comprise a graphical user interface (GUI) application for design of a virtual-agent-enhanced web site. An exemplary screen image of this design application is illustrated in FIG. 11. In an exemplary embodiment, this design application comprises a graphical editor window 100 and several menus 102-106. The graphical editor window 100 displays an image of a flow-chart-like graphical representation 101 of the web site. The graphical representation 101 may comprise nodes that are represented as graphical icons 107-110 and node links represented as lines, strings or arrows 111 that run between the node icons. The combination of node icons and node links may take the form of a flow chart. In some embodiments, the combination of node icons and node links may meet a typical flow chart standard. Some embodiments of the present invention may meet the flow chart standards described in: International Organisation for Standardisation (ISO), ISO 5807 *Information processing—Documentation symbols and conventions; program and system flowcharts*; and/or American National Standard, ANSI X3.6-1970, *Flowchart Symbols and their Usage in Information Processing*; which are hereby incorporated herein by reference.

In some embodiments, each node type may have a corresponding icon. In some embodiments, a node may represent a pre-defined page with associated content, graphics, logic, input and output mechanisms, virtual agent actions and other content. In some embodiments, node variables may define page characteristics and virtual agent characteristics, such as facial characteristics, hair color, skin tone, clothing, body characteristics, accessories and speech characteristics. Node variables for speech characteristics may comprise a text message to be spoken by the virtual agent, voice intonation, choice of language, dialect, accent, drawl and other characteristics.

Page characteristics may comprise input and output mechanisms such as text boxes, input boxes, drop-down menus and other menus as well as page style, color and formatting data.

Figure 12:
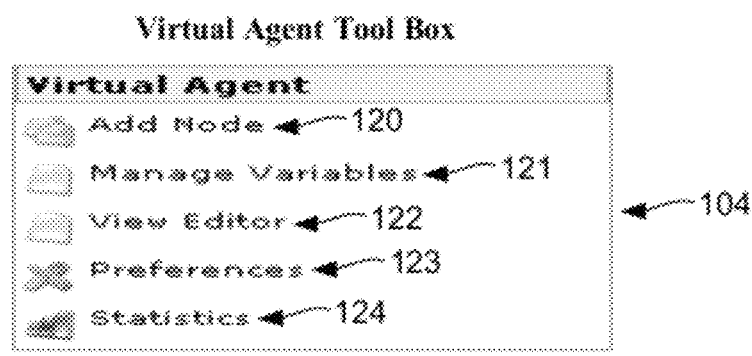
FIG. 12 is a screenshot of an exemplary tool box menu.

In an exemplary editor embodiment, a node may be added to a web site in the design process by several methods. Using a first method, a designer may select the "Add Node" option from a screen "virtual agent" tool box menu 104 (shown in FIG. 11 and FIG. 12). This selection may cause a node data window 106 to appear on the screen. Each node data window 106 comprises input mechanisms for defining node characteristics and node links. Once this information is entered through an input mechanism, a node may appear in the graphical editor window 106. Depending on the node and link information entered, the node may also have a node link 111. The icon associated with the node and the placement of the node within a flow chart structure may also be defined by the information entered into the node data window 106. In some embodiments, some node data and node link information may be input by pointing device input on the graphical editor window. In some embodiments node links, flow chart structure and other data may be input by dragging and dropping one or more points on the node icon and node link structures displayed in the graphical editor window.

In some embodiments, alternative input mechanisms may be used to accept node data input. For example, in some embodiments, a node may be established by placing a pointing device cursor on the graphical editor window 106 and effecting an input command, such as a right-click of a mouse button, which may result in the appearance of an input window comprising mechanisms for node data input. Node data may then be input in the window and the node may appear in the graphical editor window 100 upon completion of node data entry or at some other time in the process.

Subsequent nodes may then be added as needed to construct a web site comprising pages defined by nodes 107-110 and links 111 that are illustrated in the graphical editor window 100. Accordingly, an account management web site may be designed by input of node and link data that are represented visually as a flow chart of the web site. In this manner, web site logic and other attributes may be inspected and edited based on the visual representation in the graphical editor window 100.

In some embodiments, the graphical editor window 100 may comprise an exemplary tool box menu 104 (see FIGS. 11 & 12) comprising an Add Node option 120 (as described above), a Manage Variables option 121, a View Editor option 122, a Preferences option 123, a Statistics option 124 and other options.

Figure 13:
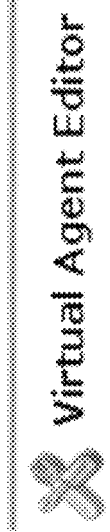
FIG. 13 is a screenshot of an exemplary virtual agent editor interface.

The Manage Variables option 121 may be used to invoke an interface that allows management of variables related to a node or web page that may comprise a virtual agent. Variables may relate to web page characteristics, virtual agent characteristics, account-holder data and other parameters. These variables may be added, changed or deleted through this interface. An exemplary Manage Variables interface is shown in FIG. 13, wherein exemplary account-holder financial variables 128 are shown. Account holder variables may be populated from internal records, a search of web-connected resources, direct account-holder input, site operator input of by other methods.

The View Editor option 122 may open, restore or move (e.g., to front of a display space) the graphical editor window 100. Selection of this option may restore the graphical editor window when other windows have been opened over it. This selection may allow a user to utilize the graphical editor window for design, modification or editing of individual elements of the web interface and provides access to graphical nodes 107-110 and links 111 for editing with the interface.

Figure 14:
FIG. 14 is a screenshot of an exemplary virtual agent preferences interface.

An exemplary tool box Preferences option 123 may invoke a preferences interface or menu that allows setting and management of global properties related to a virtual agent, a site operator, global site properties and other properties. An exemplary preferences interface window is shown in FIG. 14.

Figure 15:
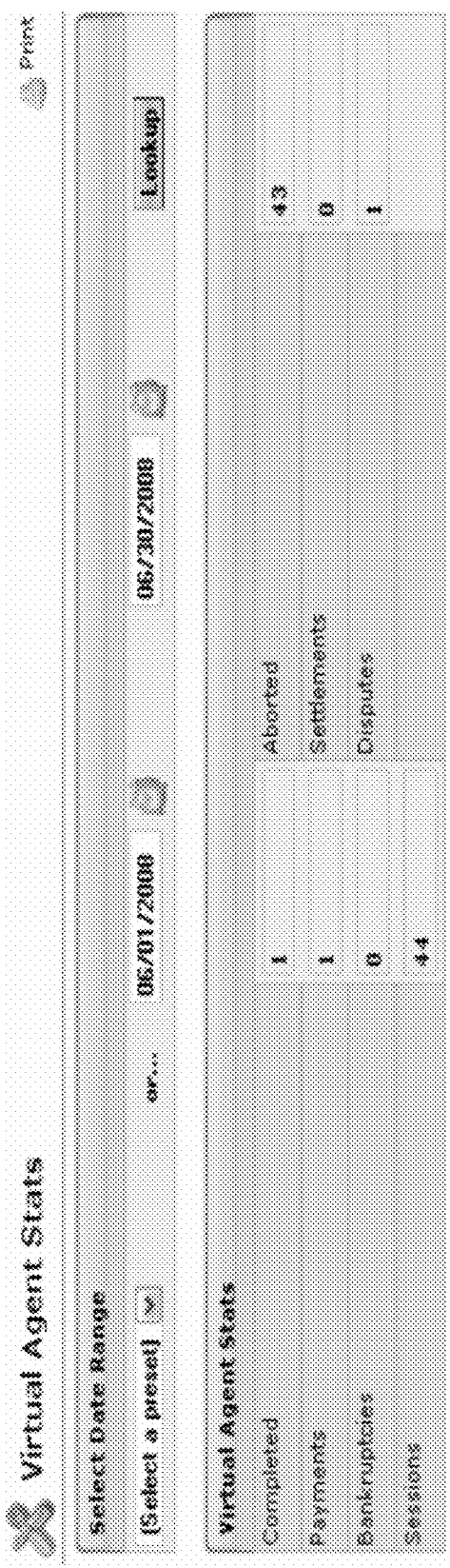
FIG. 15 is a screenshot of an exemplary virtual agent statistics interface.

Selection of the Statistics menu option 124 may invoke a window or other presentation of site performance statistics. An exemplary Statistics menu option 124 is shown in FIG. 15. Some embodiments may display statistics comprising the number of actions completed, the number of actions aborted, the number of payments completed, the number of settlements negotiated, the number of transactions involving bankruptcies, the number of disputes settled or negotiated, the number of sessions completed and other statistics.

Exemplary Nodes

Nodes, such as exemplary nodes 107-110, represent web pages that may be wholly or partially configured with variables, parameters and characteristics defined by a site operator, site designer, end user or account-holder. These variables, parameters and characteristics may be responsive to account-holder data, such as the exemplary virtual agent variables, parameters and characteristics described above.

Some embodiments of the present invention comprise a Summary Node, which may be associated with a Summary Node Icon (e.g., icons 107-110) that may be displayed in the graphical editor window 100. The Summary Node is also associated with a Summary Node Interface (e.g., window) that may display and allow editing of a node label, node text message, virtual agent characteristics and other parameters and data. An exemplary Summary Node Interface is shown in FIG. 16.

Figure 17:
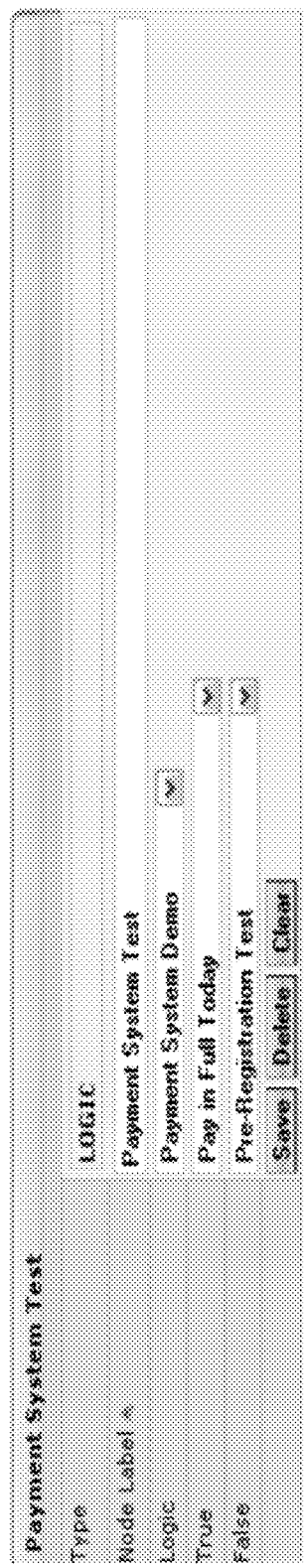
FIG. 17 is a screenshot of an exemplary Logic Node Interface.

Some embodiments of the present invention comprise a Logic Node, which may be associated with a Logic Node Icon (e.g., icons 107-110) that may be displayed in the graphical editor window 100. The Logic Node is also associated with a Logic Node Interface (e.g., window) that may display and allow editing of a node label, node logical operator, virtual agent characteristics, conditional branching and routing options and other parameters and data. In some embodiments, the logic node does not trigger display of content to an end user/account-holder, but effects logical operations based on user input or other data. An exemplary Logic Node Interface is shown in FIG. 17.

Figure 18:
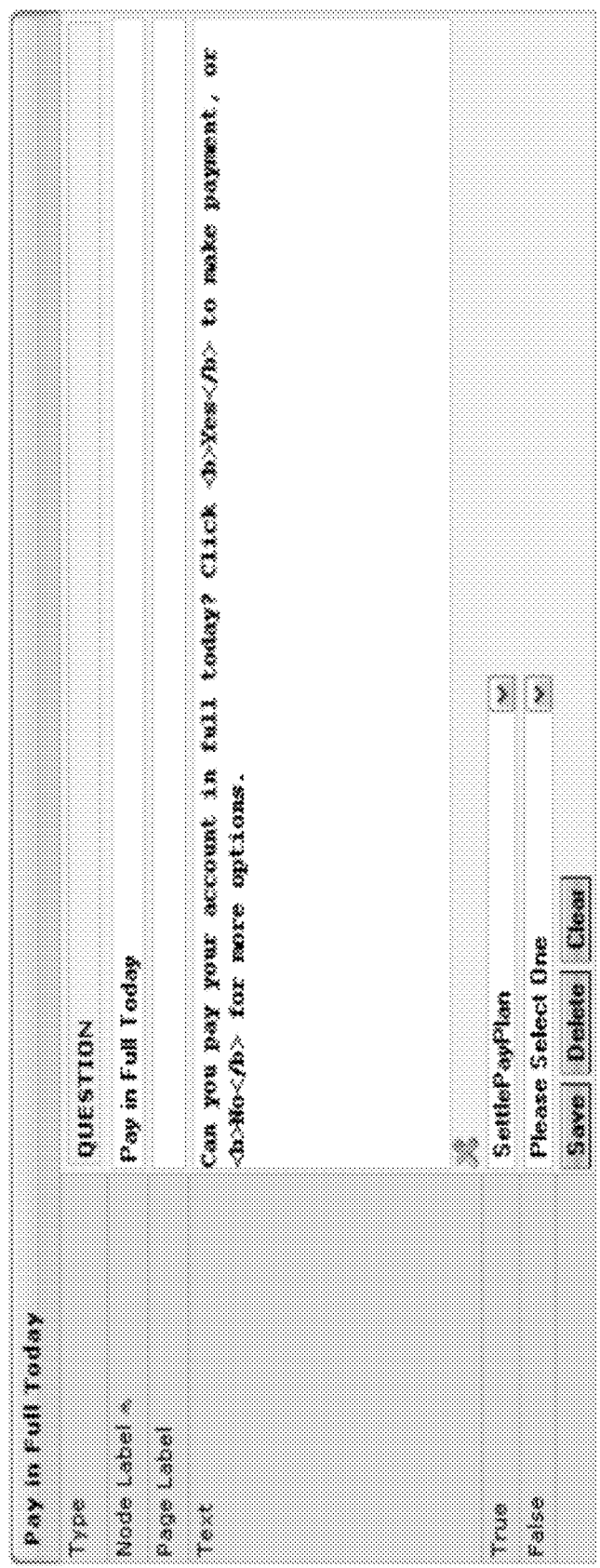
FIG. 18 is a screenshot of an exemplary Question Node Interface.

Some embodiments of the present invention comprise a Question Node, which may be associated with a Question Node Icon (e.g., icons 107-110) that may be displayed in the graphical editor window 100. The Question Node is also associated with a Question Node Interface (e.g., window) that may display and allow editing of a node label, page label, node text message or question, virtual agent characteristics, conditional branching and routing options and other parameters and data. In some embodiments, a Question Node Interface may comprise options for conditional operations based on end user responses to the associated question. In some embodiments, optional true and false selections may be defined in the interface and associated with functions based on those selections. An exemplary Question Node Interface is shown in FIG. 18.

Some embodiments of the present invention comprise an Options Node, which may be associated with an Options Node Icon (e.g., icons 107-110) that may be displayed in the graphical editor window 100. The Options Node is also associated with an Options Node Interface (e.g., window) that may display and allow editing of a node label, page label, node text message, user-selectable options, virtual agent characteristics and other parameters and data. In some embodiments, options to be presented to an end user through a web page may be selected and configured through the Options Node Interface. In some embodiments, an option label 130, option variable 131 and option prompt number may be displayed and accessed in the Option Node Interface. In some embodiments, the option label 130 or message may define a message that will be displayed as a prompt to an end user and the option variable 131 may define where the end user's response to that message is to be stored and accessed. Some embodiments of the Option Node Interface may also comprise an Update Option menu 132 or sub-interface to provide convenient editing or modification of option labels, variables and other associated parameters. An exemplary Options Node Interface is shown in FIG. 19.

Some embodiments of the present invention comprise a Property Set Node, which may be associated with a Property Set Node Icon (e.g., icons 107-110) that may be displayed in the graphical editor window 100. The Property Set Node is also associated with a Property Set Node Interface (e.g., window) that may display and allow editing of a node label, page label, node text message, virtual agent characteristics and other parameters and data. In an exemplary embodiment, a Property Set Node Interface may comprise an update property menu for convenient editing or modification of Property Set Node variables and parameters. In some embodiments, a Property Set Node may effectuate a web page that gathers input from an end user. A Property Set web page may prompt an end user with a question and provide an input mechanism for gathering data relative to that question. An exemplary Property Set Node Interface is shown in FIG. 20.

Figure 21:
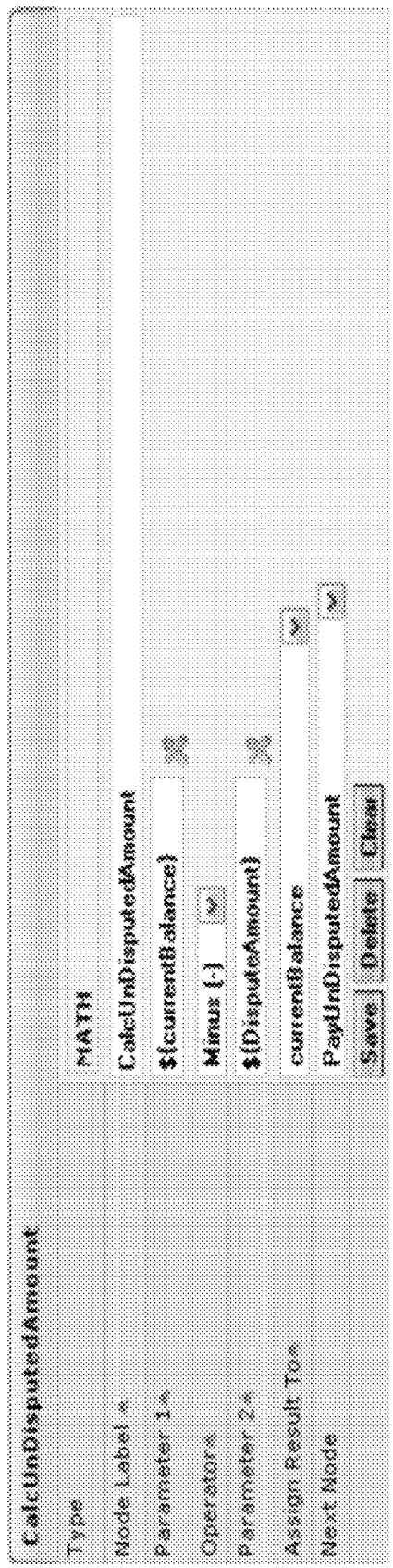
FIG. 21 is a screenshot of an exemplary Math Node Interface.

Some embodiments of the present invention comprise a Math Node, which may be associated with a Math Node Icon (e.g., icons 107-110) that may be displayed in the graphical editor window 100. The Math Node is also associated with a Math Node Interface (e.g., window) that may display and allow editing of a node label, node parameters, node variables, node mathematical operators, node links and other parameters and data. In some embodiments, operators and functions associated with a Math Node may access variables and data in local and remote locations and calculate values based on that data and the operators and function defined through the Math Node Interface. These calculated values may then be used in other calculations and conditional decision making. An exemplary Math Node Interface is shown in FIG. 21.

Some embodiments of the present invention comprise a Payment Plan Node, which may be associated with a Payment Plan Node Icon (e.g., icons 107-110) that may be displayed in the graphical editor window 100. The Payment Plan Node is also associated with a Payment Plan Node Interface (e.g., window) that may display and allow editing of a node label, node text message, node-related dates, number of payments variable, payment frequency variable, payment amount variable, payment total variable, down payment percent variable, period variable, link or next node variables, virtual agent characteristics and other parameters and data. An exemplary Payment Plan Node may effectuate a web page that prompts an end user for payment plan options and data such as a payment start date, the number of payments, the payment frequency, the payment amount, the payment total, a down payment percentage and a payment period. In some embodiments, some of these options and data may be calculated from other input either through invocation of a Math Node or by other means. In some embodiments, a Payment Plan Node may effectuate the construction of a payment plan for an end user based on user input and system data regarding the user. An exemplary Payment Plan Node Interface is shown in FIG. 22.

Figure 23:
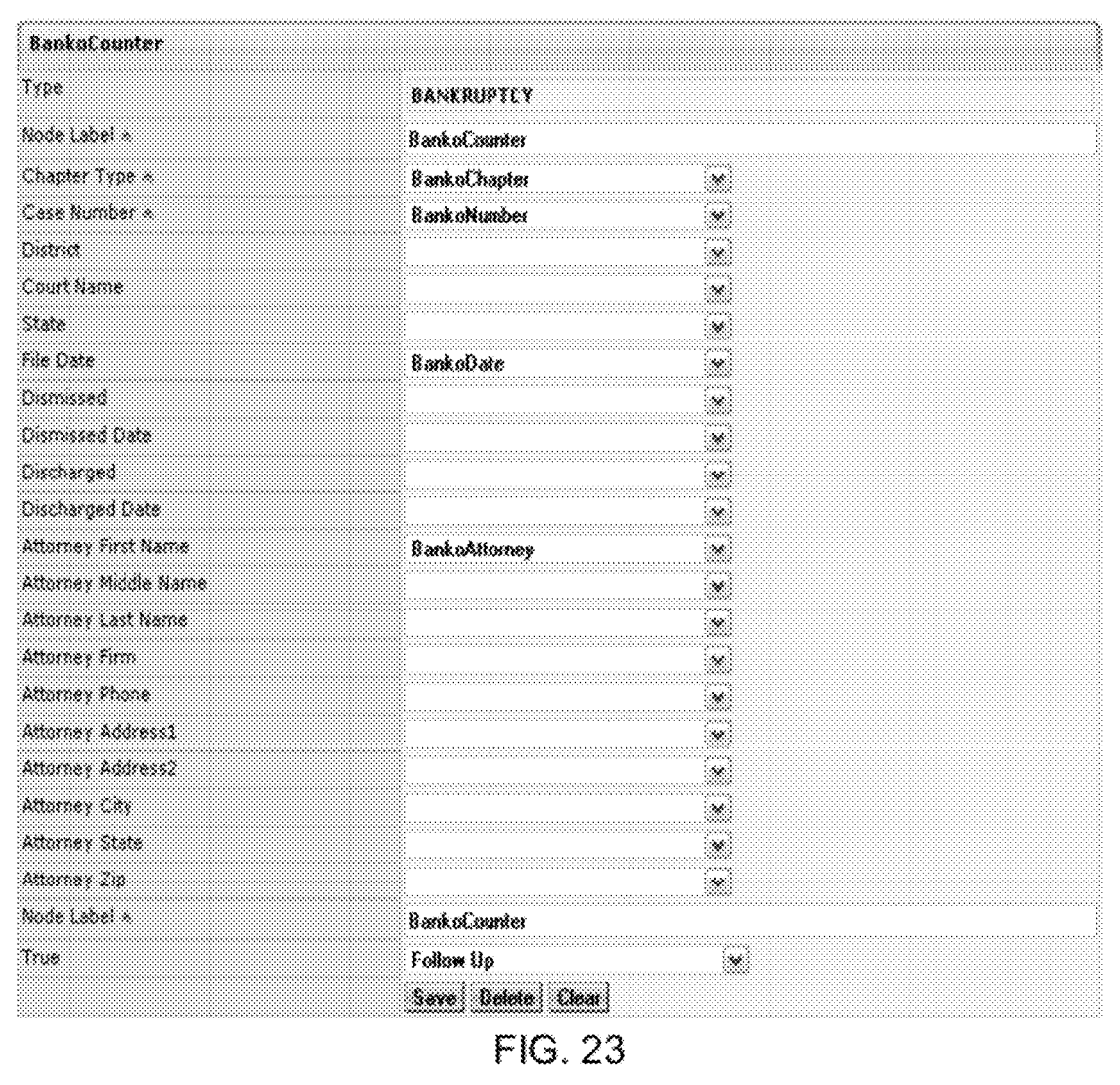

Some embodiments of the present invention comprise a Bankruptcy Node, which may be associated with a Bankruptcy Node Icon (e.g., icons 107-110) that may be displayed in the graphical editor window 100. The Bankruptcy Node is also associated with a Bankruptcy Node Interface (e.g., window) that may display and allow editing of a node label, node text message, bankruptcy chapter type, case number, district, court name, state, file date, dismissal data, dismissal date, discharge data, discharge date, attorney data comprising name, firm, phone number and address data and other parameters and data. A Bankruptcy Node may work in conjunction with a Property Set Node, which effectuates a web page that prompts an end user for bankruptcy information and provides an input mechanism for gathering and recording end user bankruptcy data. In some embodiments, a Bankruptcy Node may record and analyze data gathered with the associated Property Set Node. An exemplary Bankruptcy Node Interface is shown in FIG. 23.

Figure 24:
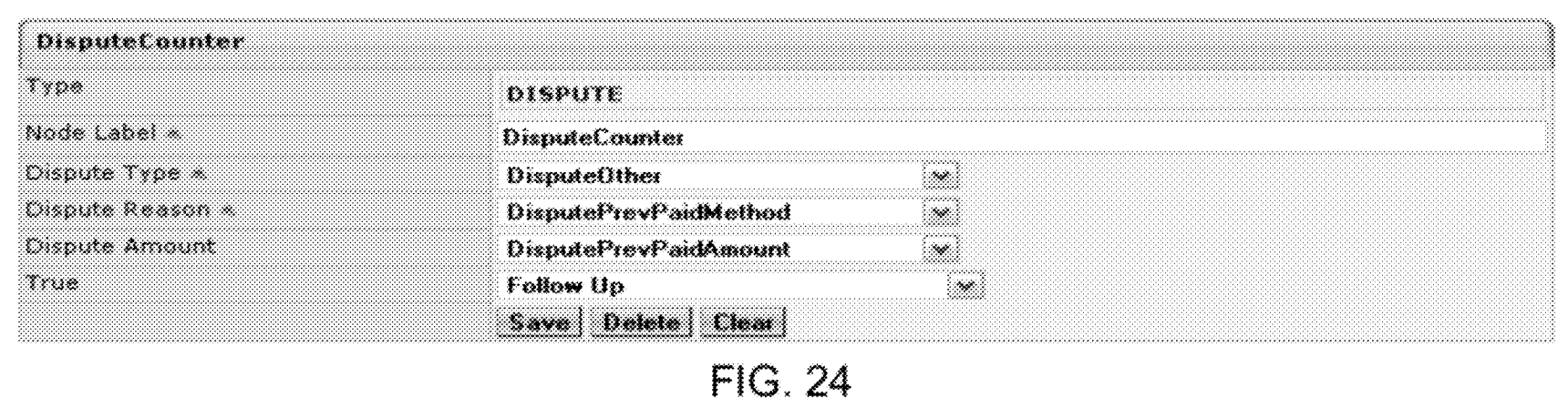

Some embodiments of the present invention comprise a Dispute Node, which may be associated with a Dispute Node Icon (e.g., icons 107-110) that may be displayed in the graphical editor window 100. The Dispute Node is also associated with a Dispute Node Interface (e.g., window) that may allow configuration of data acquisition related to a node label, dispute type, dispute reason, dispute amount, node text message, virtual agent characteristics and other parameters and data. In some embodiments, a Dispute Node may operate in conjunction with a Property Set Node to record data and statistics related to input received from a web page effectuated through the Property Set Node. In some embodiments, data gathered for dispute type, reason, amount and other data may be recorded and analyzed. This dispute data may then be used in calculations or other interfaces. An exemplary Dispute Node Interface is shown in FIG. 24.

Figure 25:
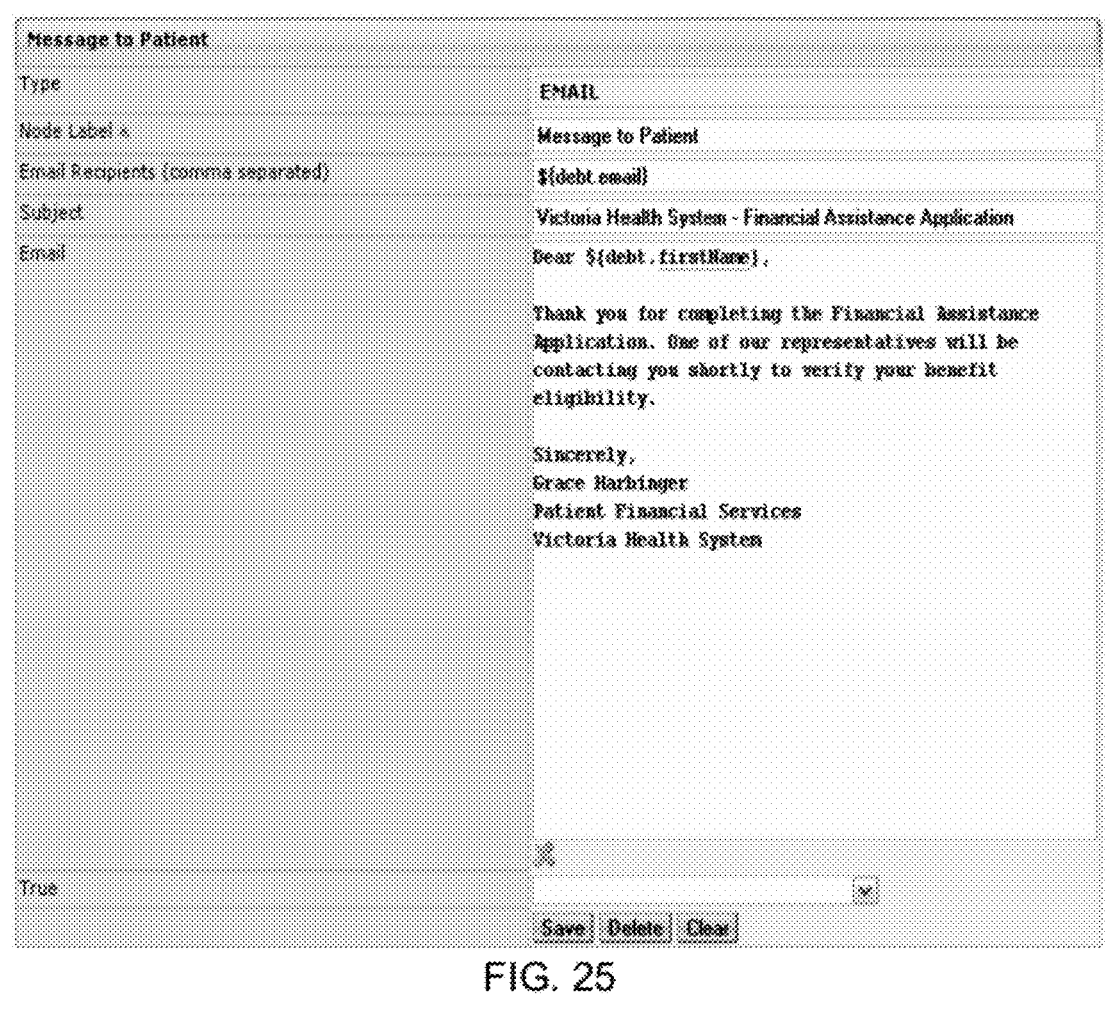

Some embodiments of the present invention comprise an E-mail Node, which may be associated with an E-mail Node Icon (e.g., icons 107-110) that may be displayed in the graphical editor window 100. The E-mail Node is also associated with an E-mail Node Interface (e.g., window) that may display and allow editing of a node label, node text message, e-mail address data, recipient data, e-mail message data, e-mail subject line data, virtual agent characteristics and other parameters and data. In some embodiments, an E-mail Node may effectuate an E-mail process that sends e-mail to designated recipients. In some embodiments, the message may be defined using the E-mail Node Interface. In some embodiments, the e-mail message and the recipients may be determined dynamically based on other variables and parameters in the system. An exemplary E-mail Node Interface is shown in FIG. 25.

Some embodiments of the present invention comprise an Exec Node, which may be associated with an Exec Node Icon (e.g., icons 107-110) that may be displayed in the graphical editor window 100. The Exec Node is also associated with an Exec Node Interface (e.g., window) that may display and allow editing of a node label, executable code, script, programming constructs, conditional operators and other parameters and data. In some embodiments, an Exec Node may provide functionality to execute programming constructs (e.g., java script) for the purpose of complex calculations, decisioning and external web service access. An exemplary Exec Node Interface is shown in FIG. 26.

Figure 27:
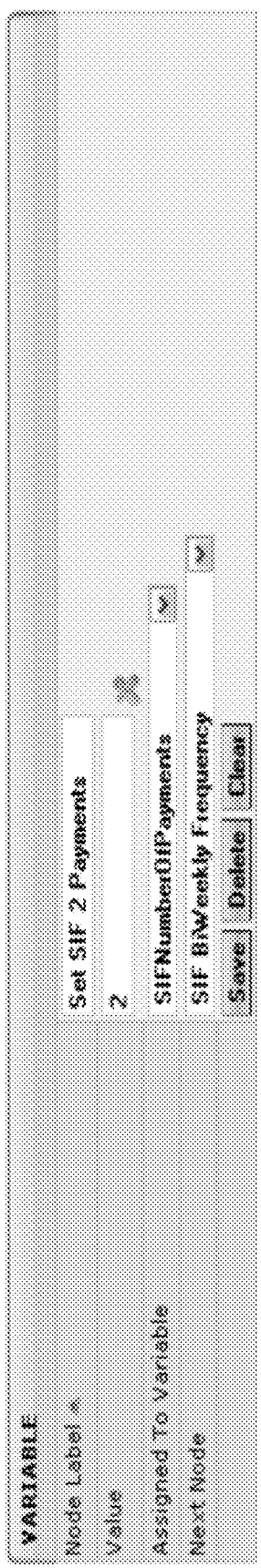
FIG. 27 is a screenshot of an exemplary Variable Node Interface.

Some embodiments of the present invention comprise a Variable Node, which may be associated with a Variable Node Icon (e.g., icons 107-110) that may be displayed in the graphical editor window 100. The Variable Node is also associated with a Variable Node Interface (e.g., window) that may display and allow editing of a node label, variable value, variable name, next node link and other parameters and data. In some embodiments, a Variable Node Interface provides for the setting of a variable value at a designate point in a web site structure. An exemplary Variable Node Interface is shown in FIG. 27.

Figure 28:
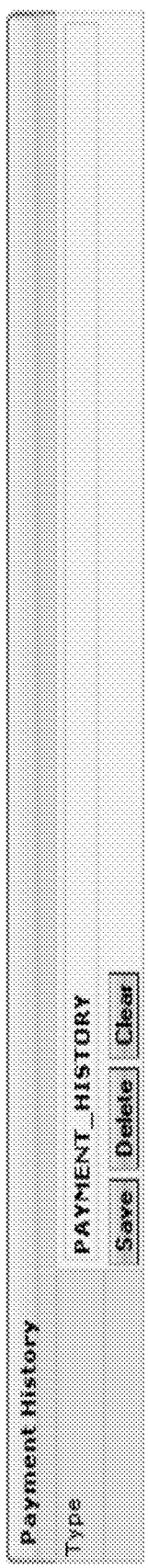
FIG. 28 is a screenshot of an exemplary Payment History Node Interface.

Some embodiments of the present invention comprise a Payment History Node, which may be associated with a Payment History Node Icon (e.g., icons 107-110) that may be displayed in the graphical editor window 100. The Payment History Node is also associated with a Payment History Node Interface (e.g., window) that may allow a site operator to save, delete, clear or otherwise modify or reset an end user's payment history data. In some embodiments, a Payment History Node may effectuate the display of an end user's payment history information. An exemplary Payment History Node Interface is shown in FIG. 28.

Some embodiments of the present invention comprise an Eval Node, which may be associated with an Eval Node Icon (e.g., icons 107-110) that may be displayed in the graphical editor window 100. The Eval Node is also associated with an Eval Node Interface (e.g., window) that may display and allow editing of a node label, executable code, script, programming constructs, conditional operators and other parameters and data. In some embodiments, an Eval Node may provide functionality to execute programming constructs (e.g., java script) for the purpose of complex calculations, decisioning and external web service access. The Eval Node may effect a process that returns a Boolean result and may define conditional processes to be followed based on the Boolean result. An exemplary Eval Node Interface is shown in FIG. 29.

Figure 30:
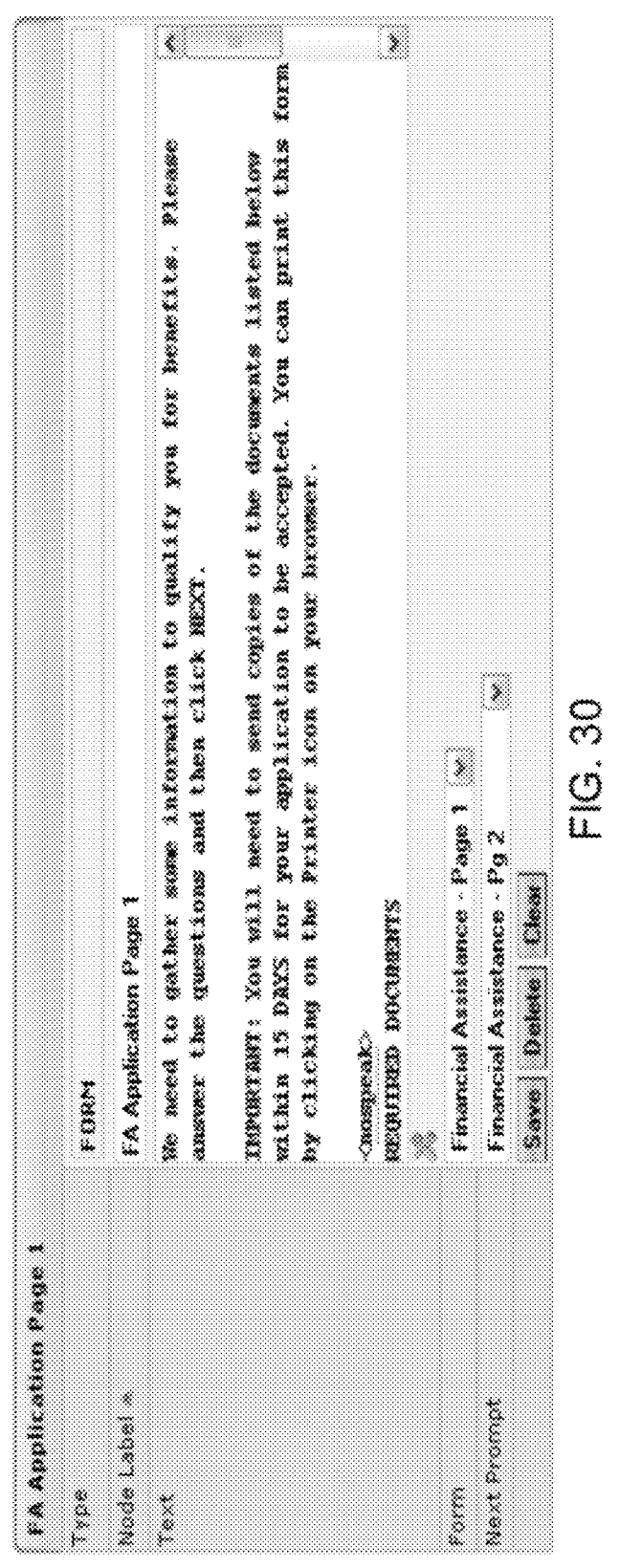

Some embodiments of the present invention comprise a Form Node, which may be associated with a Form Node Icon (e.g., icons 107-110) that may be displayed in the graphical editor window 100. The Form Node is also associated with a Form Node Interface (e.g., window) that may display and allow editing of a node label, node text message or prompt, associated form web pages, form identifier, form icon data, form type data, form instance data, form location data, form role data, virtual agent characteristics and other parameters and data. An exemplary Form Node Interface may comprise input mechanisms for a node type, node label, text message, form name and links to connected pages or forms. A Form Node may effect the display of a form and enable printing of a form from a web page interface. An exemplary Form Node Interface is shown in FIG. 30.

Figure 31:
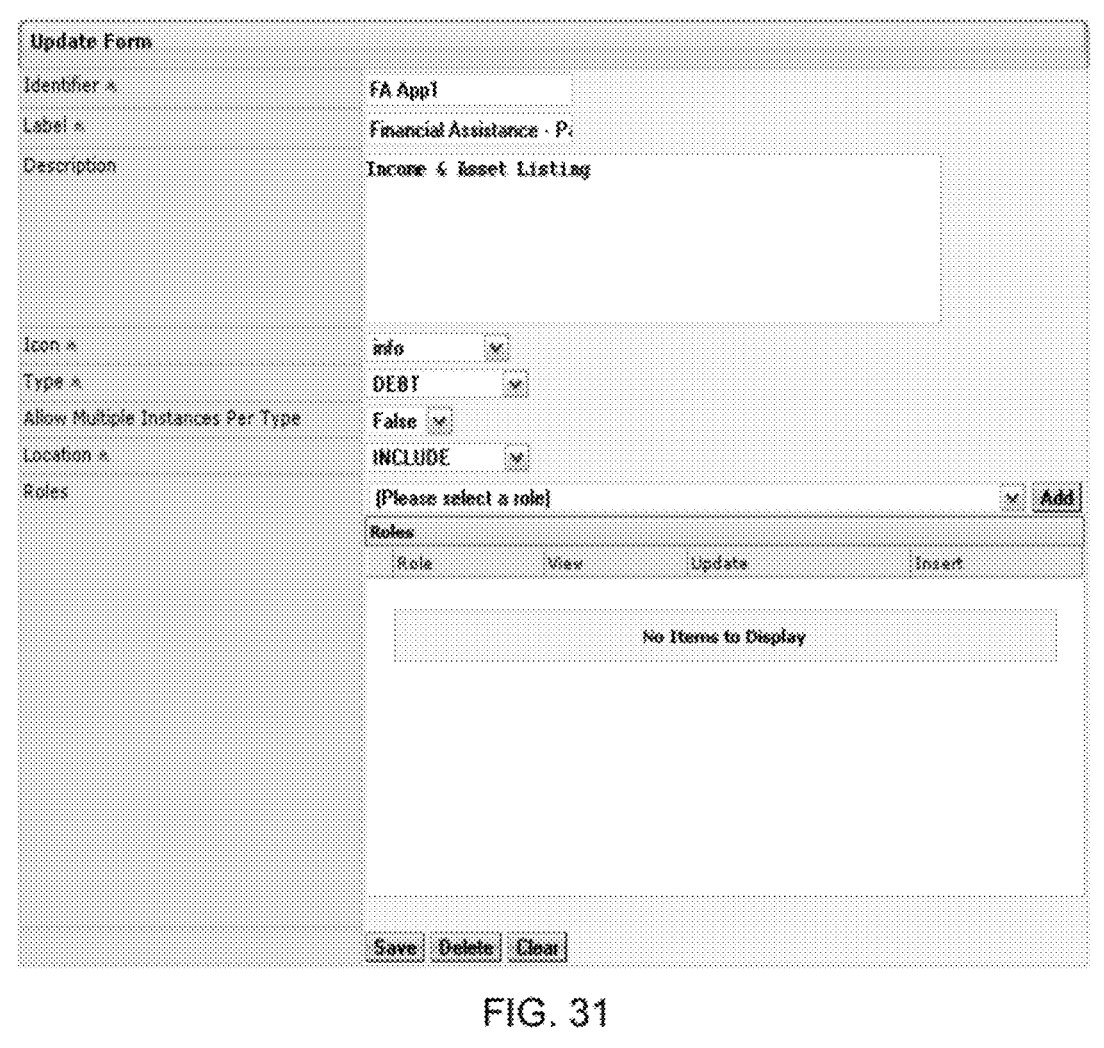

Forms accessed through web pages related to a From Node may be created and/or modified with an Update Form Interface. An Update Form Interface may comprise a window that provides for input defining a form identifier, a form label, a form description, a form icon, a form type, a form instance limitation variable, a form location variable, a form role data designator and other input. Use of the Update Form Interface may create a specific form that may be designed into a web site by placing a Form Node into the graphical editor window 100. An exemplary Update Form Interface is shown in FIG. 31.

Figure 32:
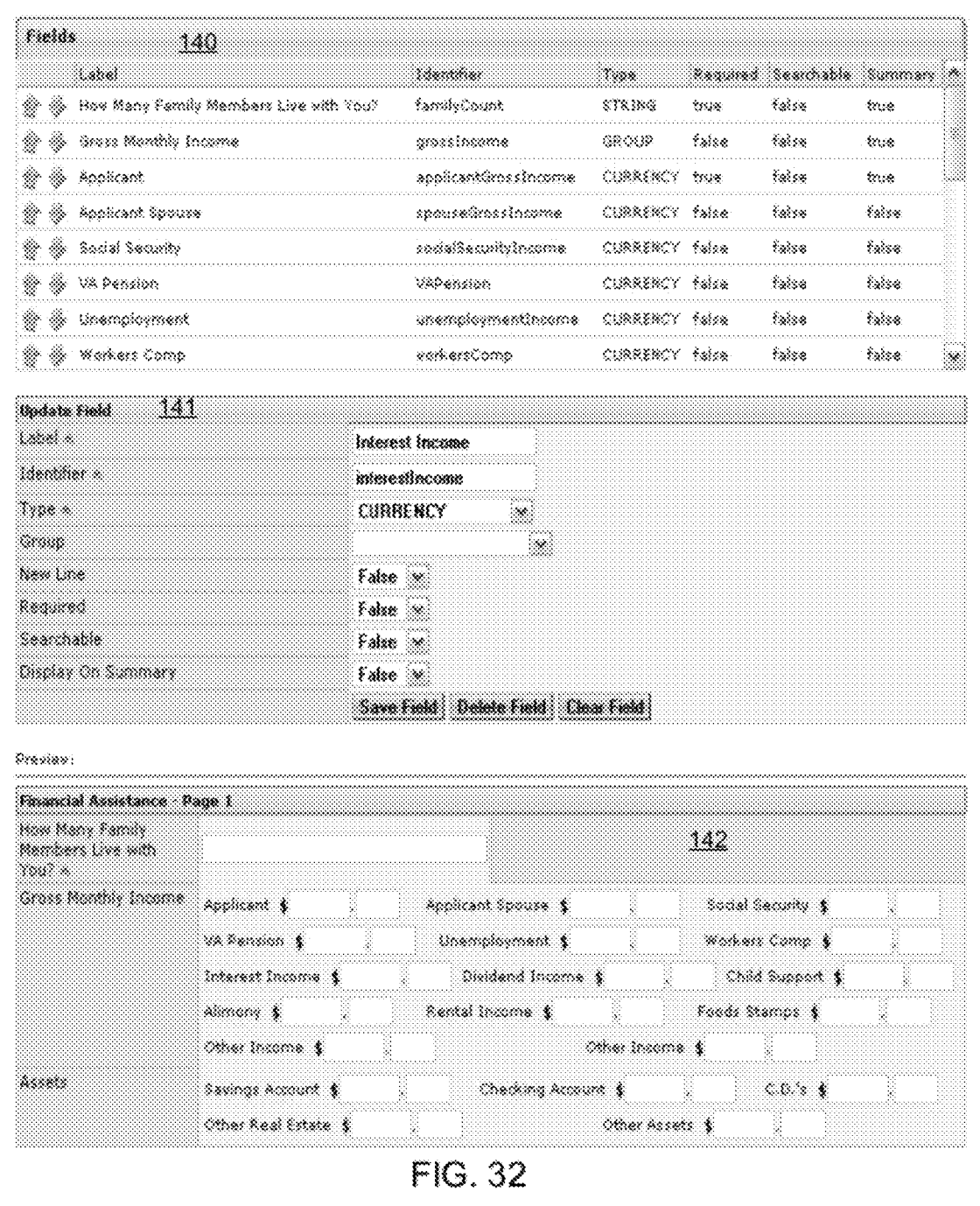

Various pages associated with nodes of embodiments of the present invention may comprise fields for collecting and storing data. Each field may be associated with a label or prompt, a field identifier, a field type and other data. These fields may be maintained with a Fields Interface, which may present a window with a list of fields and their associated values displayed for viewing and editing. An exemplary Fields Interface 140 is shown in FIG. 32.

In some embodiments, selection of a field in the Fields Interface may invoke an Update Field Interface 141, which provides editing functions for that specific field. An exemplary Update Field Interface 141 may comprise input and editing mechanisms for field parameters such as a field label, field identifier, field type, field group, field display characteristics, mandatory field status, field searchability characteristics and field display characteristics. An exemplary Update Field Interface is shown as 141 in FIG. 32.

Some embodiments of the present invention may comprise a Form/Field Preview function that may be accessed from the Form Node Interface, Update Form Interface, Fields Interface, Update Field Interface, a menu on the graphical editor window 100 and/or other locations. The Form/Field Preview function allows a form or field structure to be displayed during or after design and creation using the tools described above or by other methods. A form or field structure may be previewed to assess its accuracy and functions. An exemplary Form/Field Preview display 141 is shown in FIG. 32.

Some embodiments of the present invention comprise a Logoff Node, which may be associated with a Logoff Node Icon (e.g., icons 107-110) that may be displayed in the graphical editor window 100. The Logoff Node is also associated with a Logoff Node Interface (e.g., window) that may display and allow editing of a node label, node text message, node type, virtual agent characteristics and other parameters and data. A Logoff Node may effect a web page that displays a logoff message. In some embodiments, the web page effectuated by the Logoff Node may comprise a virtual agent that presents the logoff message in a manner described above. An exemplary Logoff Node Interface is shown in FIG. 33.

Some embodiments of the present invention comprise a graphical editor window that allows creation and placement of nodes and links in a flow-chart-like diagram, wherein nodes represent web pages and links represent relationships between the web pages. The structure of the node icons and links in the graphical editor window defines a web site. In some embodiments, nodes may represent web pages that comprise a virtual agent that may present messages both audibly and with gestures. In some embodiments, nodes may be associated with preconfigured or pre-defined web pages that are structured for a particular purpose. In some embodiments, sets of predefined web pages may be oriented to account collection and management. In account collection and management embodiments, a collection agent can quickly and easily assemble a collection web site through manipulation of nodes in a graphical editor window.

Some embodiments of the present invention comprise a web resource comprising a virtual agent that presents account collection prompts and messages using audible voice or simulated voice messages in conjunction with facial and other gestures. Some embodiments comprise a virtual agent that is adaptive to end user characteristics and data, wherein the virtual agent may change characteristics such as voice and appearance based on user characteristics.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for designing a web-based account management web site, said method comprising:

displaying a graphical user interface (GUI) web site graphical editor window on a hardware display device, said GUI web site graphical editor window comprising an option to construct or edit a web site by adding, deleting and modifying nodes representing account management web pages, wherein said GUI web site graphical editor window displays a graphical representation of said web site in a flow chart, said graphical representation comprising node icons representing said account management web pages (nodes) and node links representing transitions between said account management web pages; wherein said transitions are at least partially defined by user input;

processing said user input at a computing device in connection with said hardware display device, said user input describing first node data for a first node, wherein said first node data comprises first node variable values associated with first node variables defining a first account management web page in said web site and a corresponding first node icon;

displaying, on said hardware display device, said first node icon in said graphical editor window such that said first node icon represents a first flow chart element corresponding to said first account management web page in a flow chart that represents said account management web site; and modifying said first account management web page in said account management web site with said computing device in response to said processing;

wherein said first account management web page comprises a virtual agent, which is at least partially defined by said first node variable values, said first node variable values at least partially defining one or more actions or one or more characteristic of said virtual agent.

2. A method as described in claim 1 wherein said virtual agent presents an account-related, multi-media message to a user using animated features that move in coordination with an audible message to emulate speech and humanlike gestures.

3. A method as described in claim 1 further comprising:
a) receiving second node data for a second node, wherein said second node data comprises node variable values associated with second node variables that define a second account management web page; a corresponding second node icon and a link; and
b) displaying said second node icon and said link in a graphical editor window such that said second node icon represents a flow chart element in a flow chart representing said account management web site and said link represent a relationship between nodes in said flow chart.

4. A method as described in claim 3 wherein said second account management web page comprises a virtual agent, which is at least partially defined by said second node variable values.

5. A method as described in claim 1 wherein said first account management web page is adaptive to a user characteristic.

6. A method as described in claim 1 wherein said receiving said first node data is accomplished with a node data window.

7. A method as described in claim 3 wherein said second account management web page comprises a virtual agent, which is at least partially defined by said second node variable values, said second node variable values at least partially defining one or more actions or one or more characteristic of said virtual agent.

8. A method as described in claim 1, further comprising displaying a graphical user interface (GUI) virtual agent design window on said hardware display device, said GUI virtual agent design window comprising an option to construct or edit a virtual agent, wherein said GUI virtual agent design window displays a graphical representation of said virtual agent.

9. A method as described in claim 1 wherein said one or more actions of said virtual agent comprise a head movement, a hand gesture, a facial expression, asking a question, or reading a message.

10. A method as described in claim 1 wherein said one or more characteristics of said virtual agent comprise a facial characteristic, hair color, skin tone, clothing, a body characteristic, or a speech characteristic.

11. A system for designing a web-based account management web site, said system comprising:
a hardware display device for displaying a graphical user interface (GUI) web site graphical editor window, said GUI web site graphical editor window comprising an option to construct or edit a web site by adding, deleting and modifying nodes representing account management web pages, wherein said GUI web site graphical editor window displays a graphical representation of said web site in a flow chart, said graphical representation comprising node icons representing said account management web pages (nodes) and node links representing transitions between said account management web pages; wherein said transitions are at least partially defined by user input;
a computing device, in connection with said hardware display device, for processing said user input describing first node data for a first node, wherein said first node data comprises first node variable values associated with first node variables defining a first account management web page in said account management web site and defining a corresponding first node icon;
displaying, on said hardware display device, said first node icon in said graphical editor window such that said first node icon represents a first flow chart element corresponding to said first account management web page in a flow chart that represents said account management web site; and
modifying said first account management web page in said account management web site with said computing device in response to said processing;
wherein at least one of said nodes comprises a virtual agent, which is at least partially defined by said node variables, said first node variable values at least partially defining one or more actions or one or more characteristic of said virtual agent.

12. A system as described in claim 11 wherein said nodes and node links may be graphically manipulated by user input with a pointing device.

13. A system as described in claim 11 wherein said virtual agent responds to user input received in response to display of said node.

14. A system as described in claim 11 wherein said graphical user interface further comprises a tool box menu with options for adding nodes to said graphical representation.

15. A system as described in claim 11 wherein said node variables define facial characteristics of a virtual agent.

16. A system as described in claim 11 wherein said node variables define speech characteristics of a virtual agent.

17. A non-transitory, computer-readable medium comprising computer-executable instructions for implementing a method for designing a web-based account management web site, said computer-readable medium comprising instructions for:
displaying a graphical user interface (GUI) web site graphical editor window on a hardware display device, said GUI web site graphical editor window comprising an option to construct or edit a web site by adding, deleting and modifying nodes representing account management web pages, wherein said GUI web site graphical editor window displays a graphical representation of said web site in a flow chart, said graphical representation comprising node icons representing said account management web pages (nodes) and node links representing transitions between said account management web pages; wherein said transitions are at least partially defined by user input;

processing said user input at a computing device in connection with said hardware display device, first node data for a first node, wherein said first node data comprises first node variable values associated with first node variables defining a first account management web page in said web site and a corresponding first node icon;

displaying, on said hardware display device, said first node icon in said graphical editor window such that said first node icon represents a first flow chart element corresponding to said first account management web page in a flow chart that represents said account management web site; and modifying said first account management web page in said account management web site with said computing device in response to said processing said first node variable values;

wherein at least one of said nodes comprises a virtual agent, which is at least partially defined by said node variables, said first node variable values at least partially defining one or more actions or one or more characteristic of said virtual agent.

18. A non-transitory, computer-readable medium as described in claim 17 wherein said nodes and node links may be graphically manipulated by user input with a pointing device.

19. A non-transitory, computer-readable medium as described in claim 17 wherein said virtual agent responds to user input received in response to display of said node.

20. A non-transitory, computer-readable medium as described in claim 17 wherein said graphical user interface further comprises a tool box menu with options for adding nodes to said graphical representation.

21. A non-transitory, computer-readable medium as described in claim 17 wherein said node variables define facial characteristics of a virtual agent.

* * * * *